(12) United States Patent
Akiyama et al.

(10) Patent No.: US 6,636,460 B2
(45) Date of Patent: Oct. 21, 2003

(54) THERMALLY-ASSISTED MAGNETIC RECORDING METHOD AND THERMALLY-ASSISTED MAGNETIC RECORDER

(75) Inventors: Junichi Akiyama, Kawasaki (JP); Katsutaro Ichihara, Yokohama (JP); Akira Kikitsu, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 441 days.

(21) Appl. No.: 09/749,808

(22) Filed: Dec. 28, 2000

(65) Prior Publication Data

US 2001/0006436 A1 Jul. 5, 2001

(30) Foreign Application Priority Data

Dec. 28, 1999 (JP) .............................. 11-375083

(51) Int. Cl.$^7$ .............................. G11B 11/00; G11B 5/02
(52) U.S. Cl. ................................ 369/13.14; 369/13.13; 360/59
(58) Field of Search .......................... 369/13.14, 13.13, 369/13.33, 13.17, 13.01, 13.02, 13.32; 360/59, 313, 328, 114.01, 114.02; 428/65.3, 64.1, 64.3

(56) References Cited

U.S. PATENT DOCUMENTS

| 5,109,312 | A | * | 4/1992 | Kato et al. ................... 505/171 |
| 5,986,978 | A | * | 11/1999 | Rottmayer et al. ............ 369/13 |
| 6,367,924 | B1 | * | 4/2002 | Sato et al. ................... 347/105 |
| 6,493,164 | B1 | * | 12/2002 | Kikitsu et al. ................ 360/59 |
| 6,493,183 | B1 | * | 12/2002 | Kasiraj et al. ............... 360/126 |
| 6,507,540 | B1 | * | 1/2003 | Berg et al. ................. 369/13.13 |
| 6,515,814 | B1 | * | 2/2003 | Hamamoto et al. ........... 360/59 |

FOREIGN PATENT DOCUMENTS

| EP | 1-146507 A1 | * 10/2001 | .................. 360/59 |
| JP | 2-37501 | 2/1990 | |
| JP | 11-086375 | 3/1999 | |
| JP | 2002-133602 A | * 5/2002 | .............. 369/13.14 |
| JP | 2002-133608 A | * 5/2002 | .................. 360/59 |

OTHER PUBLICATIONS

H. Katayama, et al., Proceedings of Magneto–Optical Recording International Symposium '99, J. Magn. Soc. Jpn., vol. 23, No. S1, pp. 233–236, "New Magnetic Recording Method Using Laser Assisted Read/Write Technologies", 1999.

H. Saga, et al., Proceedings of Magneto–Optical Recording International Symposium '99, J. Magn. Soc. Jpn., vol. 23, No. S1, pp. 225–228, "A New Perpendicular Magnetic Recording Method with a Magnetic–Optical Common Preformat", 1999.

H. Katayama, et al., J. Magn. Soc. Jpn. vol. 23, No. 8, pp. 1901–1906, "Laser–Assisted Magnetic Recording Technologies", 1999 (with partial English translation).

* cited by examiner

*Primary Examiner*—Tan Dinh
(74) *Attorney, Agent, or Firm*—Oblon, Spivak, McClelland, Maier & Neustadt, P.C.

(57) ABSTRACT

In a thermally-assisted magnetic recorder configured to heat a medium with a heat source like a light beam and thereby decrease the coercive force of a recording portion so as to magnetically record information on the recording portion decreased in coercive force by applying a recording magnetic field from a recording magnetic pole thereto, relative timing between heating of the medium and magnetic recording is optimized by locating a reversing point of magnetization, in which the coercive force of the recording portion equals the intensity of the recording magnetic field, in the leading side of the trailing edge of the recording magnetic pole.

20 Claims, 14 Drawing Sheets

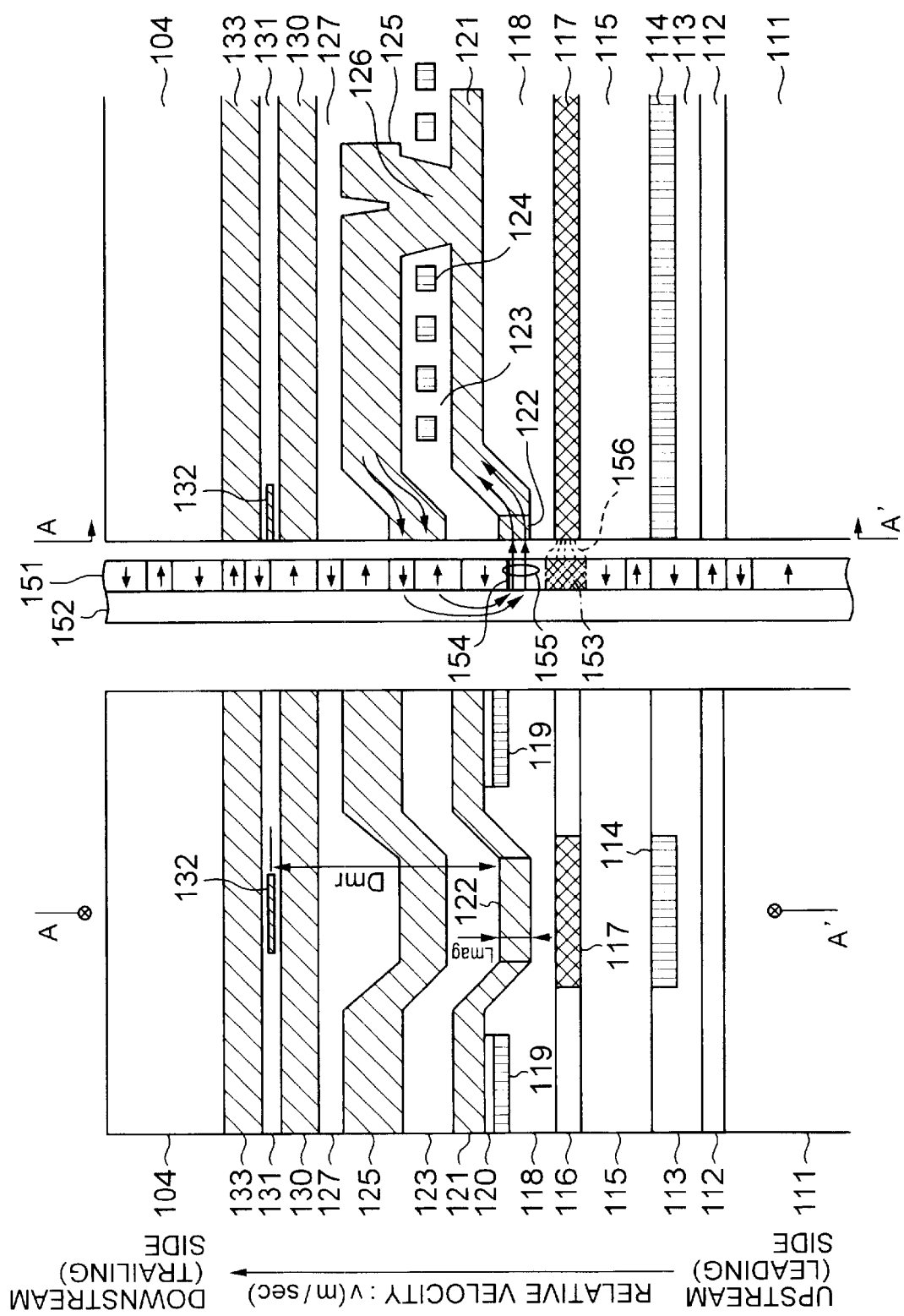

THERMALLY-ASSISTED MAGNETIC RECORDING METHOD AND THERMALLY-ASSISTED MAGNETIC RECORDER

BACKGROUND OF THE INVENTION

The present invention relates to a thermally-assisted magnetically recording method and a thermally-assisted magnetic recorder, and more particularly, to a novel method for thermally-assisted magnetic recording and a thermally-assisted magnetic recorder, capable of heating a magnetic recording medium by a heat source to magnetically record data to the medium with an extremely high density.

Magnetic recorders for magnetically recording and reproducing information are under continuous development as large-capacity, high-speed and inexpensive information storage means. Especially, recent hard disc drive (HDD) has shown remarkable improvements. As proved on the product level, its recording density is over 10 Gbpsi (gigabits per square inch), internal data transfer rate is over 100 Mbps (megabits per second) and price is as low as several yens/MB (megabytes). The high recording density of HDD is due to a combination of improvements of a plurality of elements such as signal processing technique, servo control mechanisms, head, medium, HID, etc. Recently, however, it has become apparent that the thermal agitation of the medium disturbs the higher density of HDD.

The high density of magnetic recording can be attained by miniaturizing the recording cell (recording bit) size. However, as miniaturization of the recording cell progresses, the signal magnetic field intensity from the medium is reduced. So, to assure a predetermined signal-to-noise ratio (S/N ratio), it is indispensable to reduce the medium noise. The medium noise is caused mainly by a disordered magnetic transition. The magnitude of the disorder is proportional to a flux reversal unit of the medium. The magnetic medium uses a thin film formed from polycrystalline magnetic particles (referred to as "multiparticle thin film" or "multiparticle medium" herein). In case a magnetic exchange interaction works between magnetic particles, the flux reversal unit of the multiparticle thin film is composed of a plurality of exchange-coupled magnetic particles.

Heretofore, when a medium is to have the recording density of several hundreds Mbpsi to several Gbpsi, for example, noise reduction of the medium has been attained mainly by reducing the exchange interaction between the magnetic particles and making smaller the flux reversal unit. In the latest magnetic medium of 10 Gbpsi in recording density, the flux reversal unit is of only 2 or 3 magnetic particles. Thus, predictably, the flux reversal unit will be reduced to the size of only one magnetic particle in near future.

Therefore, to ensure a predetermined S/N ratio by further reducing the flux reversal unit, it is necessary to diminish the size of the magnetic particles. Taking the volume of a magnetic particle as V, a magnetic energy the particle has can be expressed as KuV where Ku is a magnetically anisotropic energy density the particle has. When V is made smaller for a lower medium noise, KuV becomes smaller with a result that the thermal energy near the room temperature will disturb information written in the medium, and reveals the problem of thermal agitation.

According to the analysis made by Sharrock et al., if the ratio between magnetic energy and thermal energy (kT, where k is Boltzman's constant and T is absolute temperature) of a particle, KuV/kT, is not 100 or so, it will impair the reliability of the record life. If reduction of the particle size is progressed for a lower medium noise with the anisotropy energy density Ku being maintained at (2 to 3)$\times 10^6$ erg/cc of the CoCr group alloy conventionally used as a magnetic film in the recording medium, it is getting difficult to ensure a thermal agitation resistance.

Recently, magnetic film materials having a Ku value more than $10^7$ erg/cc, such as CoPt, FePd, etc., have been attracting much attention. However, simply increasing the Ku value for compatibility between the small particle size and thermal agitation resistance will lead to another problem. The problem concerns the recording sensitivity. Specifically, as the Ku value of the magnetic film of a medium is increased, the recording coercive force Hc0 of the medium (Hc0=Ku/Isb; Isb is the net magnetization of the magnetic film of the medium) increases, and the necessary magnetic field for saturation recording increases proportionally to Hc0.

A recording magnetic field developed by a recording head and applied to the medium depends upon a current supplied to a recording coil as well as upon a recording magnetic pole material, magnetic pole shape, spacing, medium type, film thickness, etc. Since the tip of the recording magnetic pole is reduced in size as the recording density is higher, the magnetic field developed by the recording head is limited in intensity.

Even with a combination of a single-pole head that will develop a largest magnetic field and a vertical medium with a soft-magnetic backing, for example, its maximum recording field is only around 10 kOe (Oe: oersted). On the other hand, to ensure a sufficient thermal agitation resistance with a necessary particle size of about 5 nm for a future high-density, low-noise medium, it is necessary to use a magnetic film material having a Ku value of $10^7$ erg/cc or more. In this case, however, since the magnetic field intensity necessary for recording to the medium at a temperature approximate to the room temperature is over 10 kOe, recording to the medium is disabled. Therefore, if the Ku value of the medium is simply increased, there will arise the problem of the recording to the medium being impossible.

As having been described in the foregoing, in the magnetic recording using the conventional multiparticle medium, noise reduction, thermal agitation resistance and higher recording density are in a trade-off relation with each other, which is an essential factor imposing a limit to the recording density.

A thermally-assisted magnetic recording system will be able to overcome this problem. Preferably, such a thermally-assisted magnetic recording system using a multiparticle medium uses magnetic particles as fine as sufficiently reducing noise and uses a recording layer exhibiting a high Ku value near the room temperature in order to ensure a thermal agitation resistance. In a medium having such a large Ku value, since the magnetic field intensity necessary for recording exceeds the intensity of a magnetic field developed by the recording head near the room temperature, recording is not possible. In contrast, in the thermally-assisted magnetic recording system, locating a medium heating means such as light beams near the recording magnetic pole and locally heating the recording medium during recording to lower Hc0 of the heated portion of the medium below the magnetic field intensity from the recording head, and recording is effected.

Important points for realizing this basic concept are: recording should be completed by supplying a recording magnetic field during heating or before the heated medium cools down; only a limited area as small as the width of the recording pole should be selectively heated to prevent that adjacent tracks are undesirably heated and adjacent magnetic transition is destructed by thermal agitation.

In a mode using a multiparticle medium, in addition to thermal agitation of adjacent tracks, it is necessary to ensure that magnetic transition created in a track to be recorded does not give influences of thermal agitation to a downstream region which does not yet cool down sufficiently. However, it has the advantage that the recording density is determined by the particle size, and flux reversal speed is remarkably high.

On the other hand, a system using a continuous magnetic film, i.e. amorphous magnetic film, has shortcomings, not involved in multiparticle systems, that the recording density is determined by the thickness of the magnetic domain wall ($10^{-20}$ nm) and, when accompanied with displacement of the domain wall, the speed of the domain wall displacement (tens of m/s) determines the data transfer speed. However, volume V of the magnetic particles can be regarded infinite, the problem of thermal agitation is out of problem. Also the system using a continuous magnetic film is equivalent to the multiparticle system in the respect of adjusting the coercive force of the medium near the room temperature higher than the head magnetic field and adjusting the coercive force of the medium of the heated portion lower than the head magnetic field.

A prior art technique trying thermally-assisted magnetic recording by using a magneto-optic medium as a continuous magnetic film is disclosed in, for example, Journal of the Magnetics Society of Japan vol. 23, No. 8, pp-1901–1906. Since this prior art uses far-field light beams as the heat source for heating a medium and locating a recording pole and the beam source in confrontation with the medium, double surface recording is impossible and near-field light cannot be used. Further, recording bit length is determined by the magnetic head, but since the recording track width is determined by the light spot, the limit of the track width is restricted by the spot size of the far-field light. That is, even when combining a short-wavelength laser and a high NA lens, the limit of the track width is hundreds of nm.

Moreover, since the light-irradiated position and the recording field applying position substantially coincide in that prior art, it has also the problem that data transfer speed is determined by the time required for heating the medium.

As explained above, the use of a multiparticle medium in a thermally-assisted magnetic recording system involves various problems, namely, uncertainty of means for moving a medium across a recording magnetic field just when the medium is sufficiently heated, difficulty of realization of a compact, light and inexpensive thermally-assisted magnetic recording head, and particularly in a mode using near-field light, lack of appropriate positional relation between the size of the optical aperture or collector and the recording magnetic pole.

On the other hand, the use of a continuous magnetic film medium involves the problems: double-surface recording being impossible, insufficient recording density due to impossibility of using near-field light, data transfer speed being restricted by the thermal response of the medium because of coincidence between the light-irradiated position and the position where the recording magnetic field is applied.

SUMMARY OF THE INVENTION

The invention has been made under the knowledge about those problems. That is, it is an object of the invention to provide a thermally-assisted magnetic recording method and a thermally-assisted magnetic recorder capable of optimizing the timing of heating the medium and magnetic recording during thermally-assisted magnetic magnetic recording for recording magnetic information by heating the medium with a heat source such as light beams, and thereby drastically improving the recording density while enabling miniaturization, reduction in weight and higher reliability.

According to the invention, there is provided a thermally-assisted magnetic recording method for first heating a recording medium to decrease the coercive force of a recording portion and thereafter applying a recording magnetic field from a recording magnetic pole onto the recording portion decreased in coercive force to enable magnetic recording of information, characterized in: a reversing point of magnetization where the coercive force of the recording portion equals the intensity of the recording magnetic field being located in a position in the leading side of the trailing edge of the recording magnetic pole.

In the thermally-assisted magnetic recording method, the relation of $D \leq Bmin$ is preferably satisfied, where D is the distance from the reversing point of magnetization and the trailing edge of the recording magnetic pole, and Bmin is the minimum magnetic transition distance recorded on the recording portion.

According to the invention, there is further provided a thermally-assisted magnetic recorder comprising: a heat source for heating a recording portion of a recording medium; and a recording magnetic pole for recording magnetic information by applying a recording magnetic field to the recording portion heated by the heat source and decreased in coercive force, a reversing point of magnetization where the coercive force of the recording portion equals the intensity of the recording magnetic field being located in a position in the leading side of the trailing edge of the recording magnetic pole.

In the thermally-assisted magnetic recorder, the relation of $D \leq Bmin$ is preferably satisfied, where D is the distance from the reversing point of magnetization and the trailing edge of the recording magnetic pole, and Bmin is the minimum magnetic transition distance recorded on the recording portion.

The thermally-assisted magnetic recorder may further comprises a magnetic reproducing element located in a position in the trailing side of the recording magnetic pole to detect the magnetic information recorded on the recording portion.

In the thermally-assisted magnetic recorder, the relation of $Dmr \leq v \cdot \Delta T \leq Dmr + Lmag$ is preferably satisfied, where Lmag is the distance from the leading edge to the trailing edge of the recording magnetic pole, Dmr is the distance from the trailing edge of the recording magnetic pole to the center of a magnetic detector of the magnetic reproducing element, $\Delta T$ is the time interval from the moment of reverting the recording magnetic field for recording magnetic transition on the recording portion to the moment for the magnetic reproducing element to detect the magnetic transition recorded on the recording portion, and v is the relative velocity between the recording portion and the recording magnetic pole.

In the thermally-assisted magnetic recorder, the heat source may be an electron emitter which emits electrons to the recording medium to heat the recording portion.

In the thermally-assisted magnetic recorder, the heat source may be a light emitting element located in a position in the leading side of the recording magnetic pole, and the relation of Dth≦4L is preferably satisfied, where Dth is the distance from the trailing edge of an emitting portion of the light emitting element to the leading edge of the recording magnetic pole, and L is the distance from the leading edge to the trailing edge of the emitting portion.

According to the invention, there is further provided a thermally-assisted magnetic recorder comprising: a light emitting element as a heat source for heating a recording portion of a recording medium; and a recording magnetic pole located in a position in the trailing side of the light emitting element to record magnetic information on the recording portion of the recording medium heated by the light emitting element by applying a recording magnetic field, wherein before the recording portion heated by the heat source passes through sad recording magnetic field applied by the recording magnetic pole, there is provided a moment where the coercive force of the recording portion is smaller than the recording magnetic field, and the relation of Dth≦4L is satisfied, where Dth is the distance from the trailing edge of an emitting portion of the light emitting element to the leading edge of the recording magnetic pole, and L is the distance from the leading edge to the trailing edge of the emitting portion.

In the thermally-assisted magnetic recorder, the recording magnetic pole is preferably buried monolithically in a position in the trailing side of the light emitting element.

In the thermally-assisted magnetic recorder, the light emitting element may be a laser element having a fine hole, and the emitting portion is the fine hole.

The Inventors of the present invention propose a thermally-assisted magnetic recorder based on a novel concept to attain the above object. In this thermally-assisted magnetic recorder, magnetic particles so fine that noise therefrom is sufficiently small are used and a recording layer having a high Ku value at a temperature near the room temperature is used to ensure a thermal agitation resistance. In a medium having such a large Ku value, since the magnetic field intensity necessary for recording exceeds the intensity of a magnetic field developed by the recording head under a temperature near the room temperature, recording is not possible. However, by locally heating the recording medium by an appropriate means, the Hc0 value of the heated portion of the medium can be reduced to below the magnetic field of the recording head to enable recording.

The recording medium may be heated by using light beams or electron beams.

For emitting electrons, any electron emitter of various types such as field emission type, thermoelectronic emission type, etc. may be used. The "field emission type" is such that by providing a high potential gradient (electric field) on an electron emission surface, electrons are directly emitted from the surface. Especially when the present invention adopts a field emission type electron emitter, since the electron emission area is on the order of 10 nm, an area of about 10 nm of the medium can easily be heated, thus the present invention can attain a resolution far beyond that of the conventional method using light beams. However, in case of an electron emitter of the thermoelectronic emission type being used, substantially the same effect is still obtained by converging the electron beam to a predetermined size.

As having been described in the foregoing, according to the present invention, a low-noise multiparticle medium formed from very fine particles, necessary for high density magnetic recording and reproduction, can be made to have a sufficiently high resistance against the thermal agitation at a temperature near the room temperature, and the coercive force of the medium, that is, a necessary magnetic field for a flux reversal, is reduced by irradiation of light beams or electron beams onto a portion of the medium to which a recording magnetic field is applied, to thereby enable a practical thermal characteristic head to attain a high speed of recording.

Further, the invention enables the use of near-field light by supplying both light beams as the heat source and recording magnetic field from a common side of the medium, and thereby enables selective heating of a region as fine as tens of nm that cannot be realized with far-field light.

According to the invention, since the light emitting element and the magnetic recording element form an integral structure, excluding the optical system having a complicated structure and a heavy mass, the invention ensures high-speed seek operation by the head, much higher efficiency of the use of light as compared with light irradiation by using a waveguide or a fiber, and the use of a semiconductor laser of tens of mW.

According to the invention, by sequentially stacking the light emitting element and the recording magnetic pole from the downstream (leading) side of moving direction of the medium to closely locate the light emitter and the recording magnetic pole, a recording magnetic field can be applied when Hc0 of the medium has become sufficiently low.

Furthermore, by limiting the positional relation between the heat source and the recording magnetic pole within a unique range, useless flux reversal of the recording section by the recording magnetic field can be prevented.

That is, according to the invention, there can be provided a thermally-assisted magnetic recorder realizing a new concept that information can be recorded with a drastically higher density than with the conventional recorder. Thus the present invention is very advantageous in the field of art.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIGS. 1A through 1C are schematic diagrams for explaining an outline of the first embodiment of the invention, in which FIG. 1A is a cross-sectional view that shows the basic placement of a recording head and a recording medium, FIG. 1B graphically shows thermal response of the recording medium, and FIG. 1C graphically shows a relation between coercive force Hc0 of the recording medium and recording magnetic field Hw of the recording head;

FIGS. 4A and 4B show a model of a thermally-assisted magnetic recorder according to the second embodiment of the invention, in which FIG. 4A is a plan of a thermally-assisted magnetic head viewed from a medium surface, and FIG. 4B is a sectional view, with the medium involved, taken along the line A–A' of the track direction;

FIGS. 7A and 7B is a diagram that shows a general construction of a thermally-assisted magnetic recording head according to a model of the invention, in which FIG. 7A is a plan view taken from a medium surface, and FIG. 7B is a sectional view, with the medium involved, taken along the line A–A' of the track direction;

FIGS. 11A through 11C schematically show the process of recording by the thermally-assisted magnetic recording head according to the present invention, in which FIG. 11A is a sectional view of a portion extracted from FIG. 7B as being associated with the recording process, FIG. 11B graphically shows a light beam profile on the medium and a temperature distribution on the medium and FIG. 11C graphically shows a spatial distribution of the medium coercive force and that of the recording magnetic field;

DETAILED DESCRIPTION OF THE PREFERRED EMBODIMENTS

Some embodiments of the invention will be explained below in detail, referring to some models.

(First Embodiment)

As the first embodiment of the invention, here is first explained a unique configuration related to the timing of heating a medium and magnetic writing.

Figure 1A:
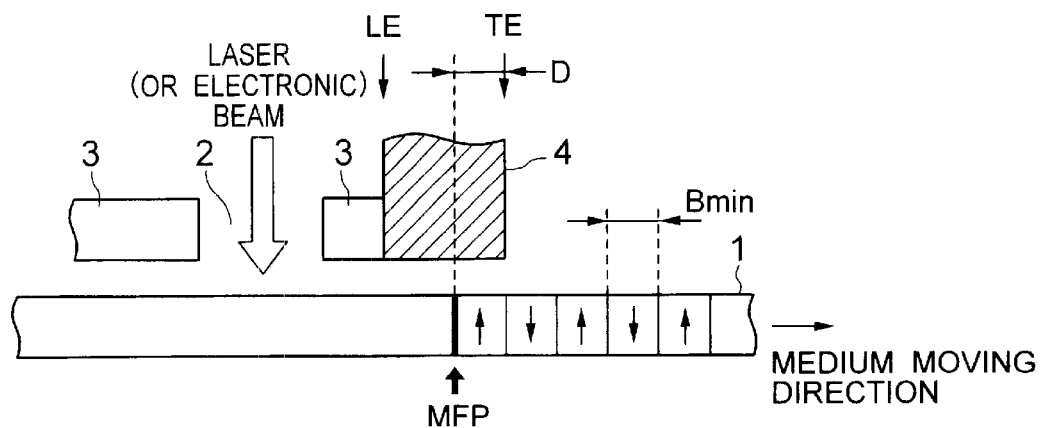
Figure 1B:
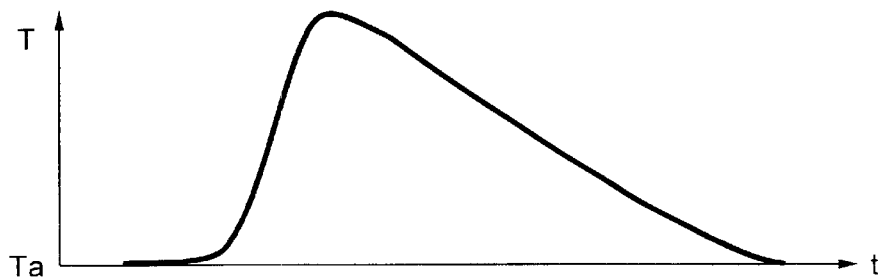
Figure 1C:
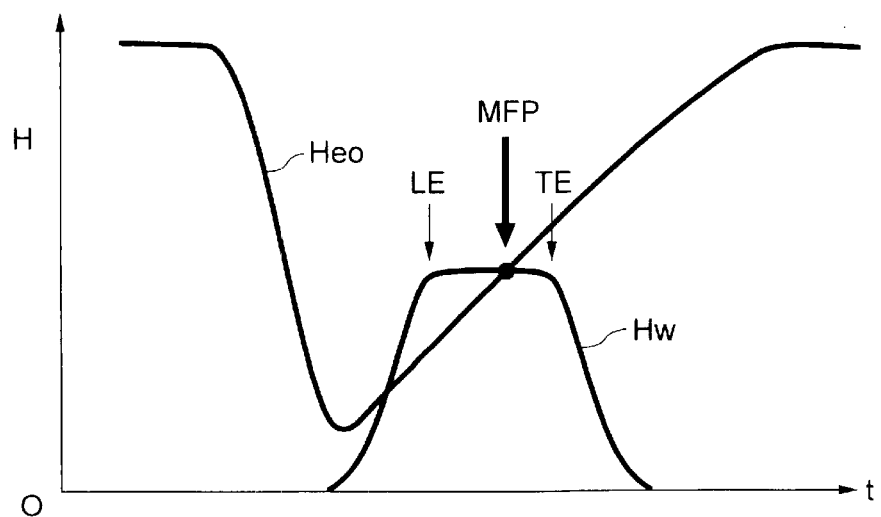

FIGS. 1A through 1C are schematic diagrams for explaining an outline of the first embodiment of the invention, in which FIG. 1A is a cross-sectional view that shows the basic placement of a recording head and a recording medium, FIG. 1B graphically shows thermal response of the recording medium, and FIG. 1C graphically shows a relation between coercive force Hc0 of the recording medium and recording magnetic field Hw of the recording head.

In FIG. 1A, reference numeral 1 denotes a recording magnetic layer of a medium, 2 an emission hole of a heat source, 3 a partition wall around the emission hole, 4 a recording magnetic pole, LE a leading edge of the recording magnetic pole, TE a trailing edge of the recording magnetic pole, MFP a reversing point of magnetization (magnetically frozen point) where Hc0 and Hw are equal in magnitude, D the distance between MFP and TE, and Bmin the minimum distance of magnetic transition.

Usable as the heat source for heating the medium are light beams or electron beams. As a mode using light beams, for example, there is a model that stacks a total reflection film 3 on the emission surface of an edge-emitting laser and making a fine optical aperture 2 near a central part of the active layer. As a mode using electron beams, there is a model that makes an emitter cone at the location for the aperture 2 and directly irradiating electron beams emitted field emitted from the cone tip onto the medium.

In the mode using an aperture shown in FIGS. 1A through 1C, light beams or electron beams emitted from the aperture 2 impinge the medium 1, and the moving direction of the medium is from left to right in the figure, as labeled "Medium moving direction" in FIG. 1A. In this case, the left side of each element is defined as the leading side, and the right side is defined as the trailing side.

Then, in the instant embodiment, the distance D between MFP and TE and the minimum magnetic transition distance Bmin are determined to satisfy D≦Bmin.

Temperature of the recording magnetic layer exhibits a time response as shown in FIG. 1B, for example. That is, the ordinate T of FIG. 1B is the temperature of the magnetic layer, and the abscissa t shows the time. If the time t is multiplied by the linear velocity, Abscissas of FIGS. 1B and 1C can be interpreted to be a position in the recording track direction. Thermal response of the medium depends upon the spatial profile of irradiated heat beams, power of the heat beams, moving velocity (linear velocity) of the medium relative to the beams, film material of the medium (thermal-physical properties), film thickness, film structure (although not shown in FIGS. 1A through 1C, having a base layer, protective layer, lubricant layer, and so on, in addition to the recording magnetic layer), and so forth. Analysis of heat response f mediums in its actual dimension results as shown in FIG. 1B in which the cooling time is longer than the time required for the medium to pass across an area under the recording magnetic pole.

That is, in a magnetic recording system of a class around hundreds of Gbpsi in the future, Bmin will be reduced to tens of nm, and the recording track width will be reduced to below hundreds of nm. To prevent side-erasure (undesirable erasure of information on adjacent tracks), the beam size should be regulated to about the track width, and therefore, the size of the aperture 2 should be about 200 nm, for example. If Gauss-type beams are emitted from the aperture, for example, effective heating range is about 100 nm corresponding to the full width at half maximum, and if the linear velocity is 20 m/2, the effective heating time becomes approximately 5 ns.

When the medium structure is thermally adjusted for higher thermal response, the heating speed is tens of K/ns, and if the heating speed is 50 K/ns, the medium can be raised in temperature by about 250 K. Since the cooling speed is around 20 K/ns in average, for lowering the temperature by 250 K, the time of 12.5 ns is required, and the medium moves over 250 nm meanwhile.

On the other hand, from the viewpoint of the principle of thermally-assisted recording, distance between the aperture as the heating section and the recording magnetic pole should be as close as possible. Its reason is such that, since the grain size of the medium should be minimized for higher density, a magnetic film having a giant magnetic anisotropy energy (Ku) should be used as the medium from the viewpoint of ensuring a sufficient thermal agitation resistance at the room temperature. Since, with an increase of Ku, the coercive force (Hc0) at the room temperature increases and makes recording more difficult, the recording temperature is inevitably set high for thermally-assisted recording. Therefore, unless the recording magnetic field is applied just when the medium is sufficiently heated, recording will be impossible. This is the reason why the aperture and the recording magnetic pole should be located as close as possible.

For example, distance between the aperture 2 and LE of the recording magnetic pole will be determined within the range less than tens of nm, e.g. 20 nm, and the recording magnetic field will be applied to the medium 1 ns after the medium passes the trailing edge of the aperture when the linear velocity is 20 m/s. As shown in FIG. 1B, while the medium passes below the recording magnetic pole, the medium temperature decreases continuously, and as a result, Hc0 increases as shown in FIG. 1C. Since Hw≧Hc0 must be satisfied for recording, magnetization of the medium is frozen at MFP.

In thermally-assisted magnetic recording already proposed, length of the recording pole in the track direction (LE-TE distance) was not a target of consideration, and nothing has been regulated about it. In contract, the instant embodiment puts an importance to the positional relation, and rules a unique configuration. Although its theoretical basis and effect will be explained later, here is explained why the relations between locations of individual elements and the cooling time is as shown in FIGS. 1A through 1C.

In the case where MFP is at a middle point of the magnetic pole (at a point between LE and TE) and the minimum magnetic transition distance is 20 nm, for example, length of the recording magnetic pole in the track direction is 40 nm according to the rule of the instant embodiment. At the linear velocity of 20 m/s, the time for the medium to pass below the recording magnetic pole is 2 ns. This value and the time 1 ns for passing the distance between the aperture and LE are much shorter than the time 12.5 nm required for cooling the medium to near the room temperature. Although those values may vary to a certain extent with the linear velocity, thermal response of the medium, position of MFP, and so forth, it is easily estimated that the medium will pass the recording magnetic pole before it is cooled sufficiently as shown in FIGS. 1A through 1C.

In conventional magnetic recording, MFP was TE of the magnetic pole. In the instant embodiment, however, MFP is located nearer to LE than TE of the magnetic pole. This produces two effects, one being a recording sharpness and the other being reliability of thermal agitation resistance after recording.

Regarding the recording sharpness, it is meant that spatial sharpness of Hc0 is sharper than the spatial sharpness of the recording magnetic field Hw. It is known that magnetic transition width of the medium, spacing between the head the medium, and spatial sharpness of Hw are factors that limit the linear density. Hw sharpness is usually less than 100 Oe/nm, and typically around 50 Oe/nm. On the other hand, as already explained, Hc0 changes from its value at the maximum value temperature to the value at the room temperature by 250 nm. Using again the value shown in the foregoing explanation, distance from the recording point to the room temperature is about 200 nm. As the difference between Hc0 at the recording point and Hc0 at the room temperature increases, density is made higher as explained above. However, assuming that a medium with Hc0 at the room temperature being 50 kOe, adjusting Hc0 at the recording point to be 10 kOe, since the change of Hc0 is 40 kOe per 200 nm, spatial sharpness of the Hc0 becomes 200 Oe/nm, and the recording sharpness can be said to be improved much more than the conventional magnetic recording.

The other effect, namely, reliability of thermal agitation resistance immediately after recording, is one of great features of the instant embodiment. On the trailing side from MFP, since Hc0>Hw, magnetization of the medium does not change with Hw alone, but the temperature of the recording layer still remain high. using the above-mentioned numerals, over the distance of 200 nm after MFP (which corresponds to the time of 10 ns when the linear velocity is 20 m/s), KuV/kT does not rise sufficiently, and there is a possibility of re-reversal. However, in the range of time where the medium passes the distance from MFP to TE, Hw functions toward preventing reversal by thermal agitation, and re-reversal does not occur at least during this time. However, it should be noted that, if polarity of Hw undesirably reverts while the medium passes from MFP through TE, Hw changes toward supporting thermal agitation, and there is a large possibility of immediate re-reversal.

Moving distance of the medium within the time for Hw to change the polarity is the minimum magnetic transition distance Bmin. Therefore, by establishing D≦Bmin as ruled by the invention, application of Hw will function only toward preventing re-reversal just after recording, and will not function toward supporting thermal agitation.

The instant embodiment is further explained below in greater detail, using some models.

Figure 2:
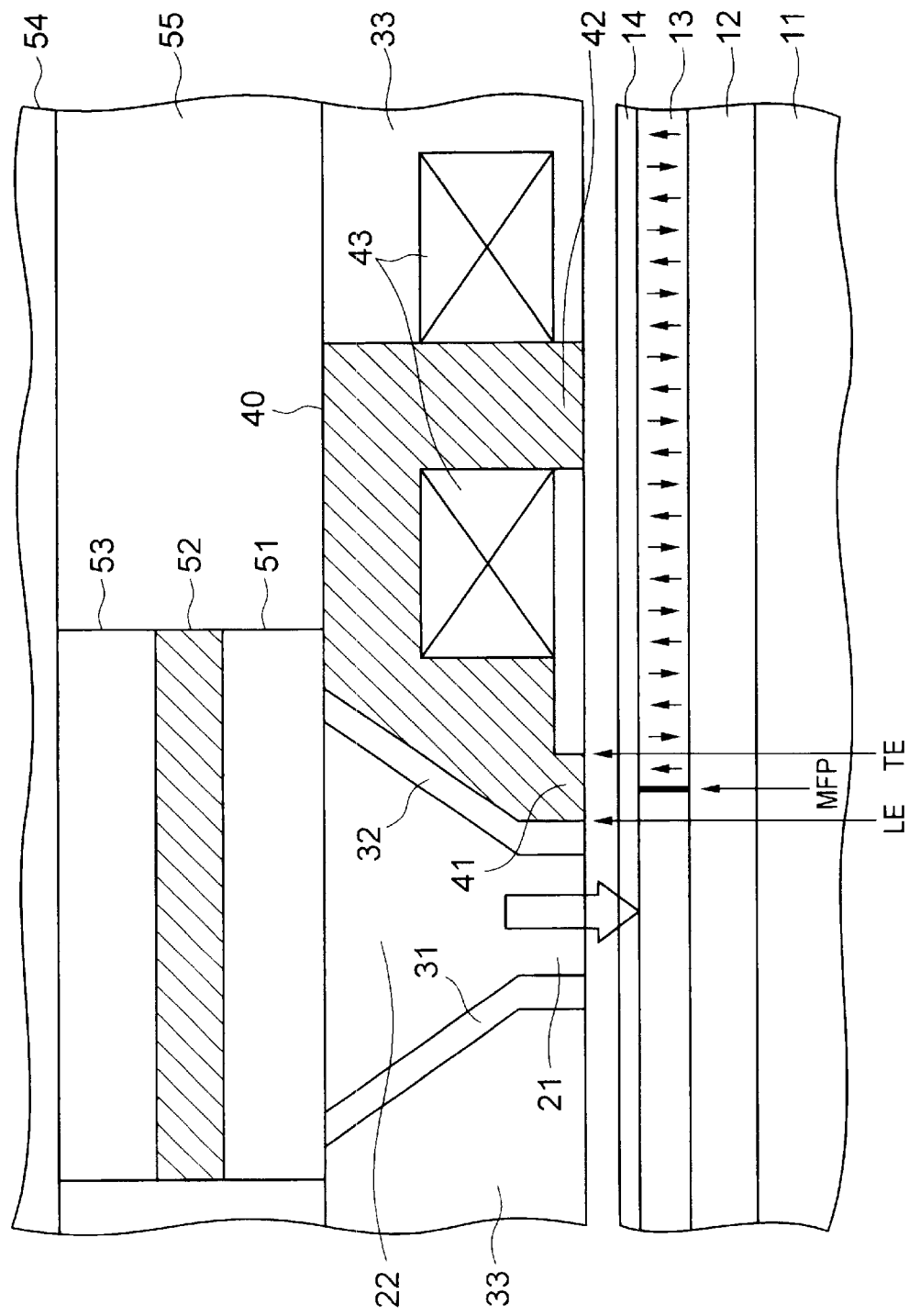
FIG. 2 is a sectional view that shows a model of a major part of the thermally-assisted magnetic recorder according to the first embodiment of the invention.

FIG. 2 is a sectional view that shows an example of a major part of the thermally-assisted magnetic recorder according to this embodiment. In FIG. 2, reference numeral refers to a magnetic medium substrate, 12 to a base layer, 13 to a recording magnetic layer and 14 to a protective layer, which all form a magnetic recording medium section. Further, numeral 21 refers to an optical aperture and 22 to a waveguide, which form an optical aperture section. Numeral 31 refers to a first waveguide partition, 32 to a second waveguide partition, and 33 to a third partition, which all form a magnetic recording head partition. Numeral 40 refers to a recording magnetic pole entire mass, 41 to a recording magnetic pole, 42 to a return path and 43 to a coil, which all form a magnetic recording head recording magnetic pole section. Numeral 51 refers to a second cladding layer, 52 to an active layer, 53 to a first cladding layer, 54 to a laser element growth substrate, and 55 to a laser element partition, which all form a laser element section.

The thermally-assisted magnetic recording head and the thermally-assisted magnetic recording medium shown in FIG. 2 can be made by the following process, for example.

First explained is a method for fabricating a laser-incorporated magnetic head.

The first cladding layer 53, active layer 52 and second cladding layer 51 are sequentially stacked by crystal growth on the laser element growth substrate 54 of GaAs or sapphire, both being representative substrate materials, by using MOCVD (metal-organic chemical vapor deposition) or MBE (molecular beam epitaxy), for example, to form surface-emitting laser elements in form of islands in accordance with intervals of magnetic recording/reproducing element regions (for example, hundreds of μm). FIG. 2 illustrates only a major part of the laser element. Detailed structure of the cladding layer, active layer and others, as well as the electrode, are omitted from illustration of FIG. 2 for simplicity.

Spaces between island-like laser elements are buried with the partition 55, and smoothed, if necessary.

After that, the planar type magnetic head section is sequentially formed on the bottom surfaces of 51 and 55. The process of fabricating the magnetic head element section includes optionally selectable factors regarding materials and process techniques, but a typical example is explained here.

First of all, the waveguide section 22 and the optical aperture section 21 are made. For example, after stacking a $SiO_2$ film by sputtering, using double etching processes of $CHF_3$—RIE (reactive ion etching) and CDE (chemical dry etching), the aperture section is vertically processed, and the waveguide is taper-processed to obtain the configuration of FIG. 2.

After that, the partitions 31, 32 are made by CVD or sputtering of a material with a high melting point and a high reflectance, such as TiN or Ta—N, for example, or a high melting point metal, such as W, Mo or Ta, for example. At that time, materials of the partitions 31, 32 may stack on the bottom surfaces of 51 and 55. For better adhesion of the partition films 31, 32 onto the side wall of the aperture 21, CVD or substrate rotation-type sputtering is preferable.

After that, a resist, for example, is buried as the partition 33, and it is next patterned to follow the configuration of the recording magnetic pole entire mass 40 and the coil section 43.

After that, the recording magnetic pole entire mass 40 is grown to the upper surface of the coil by resist frame plating growth, for example, and through patterning formation of the resist in accordance with the coil pattern, and through frame plating growth of a Cu coil, for example, the remainder part of the magnetic pole is again grown by plating growth. Since the recording magnetic pole section 41 is of a fine pattern around 100 nm, for example, it finally undergoes FIB (focused ion beam) processing, if necessary.

Through the process explained above, the light emitting section and the recording magnetic pole of the thermally-assisted magnetic head of FIG. 2 is obtained. The reproducing element section can be made appropriately in the trailing side (right side of FIG. 2) of the recording magnetic pole, thereby to obtain the thermally-assisted magnetic head incorporating the light emitting element. The foregoing embodiment is an example of a combination of the surface-emitting laser and the vertical recording head. The invention, however, is also applicable to an edge-emitting laser or lengthwise recording head. In a mode using an edge-emitting laser, the active layer may be located directly above the optical aperture, for example, so as to emit light in the same direction as FIG. 2. When it is applied to lengthwise recording, a second recording magnetic pole may be located on the left of the partition 31.

It is also possible to use electron beams as the heat source, instead of a laser. In this case, by locating a cone-shaped emitter of C (carbon), for example, at the portion of the aperture 21 and applying a negative voltage to the medium, field-emission electron beams sufficient for heating the medium can be obtained.

Next explained is a process for fabricating the thermally-assisted magnetic recording medium shown in FIG. 2. Representative materials for the medium substrate 11 are glass and AlP-coated Al substrate, for example, and individual layers of the medium are typically formed on the substrate by sputtering.

In an example of a vertical medium, a soft-magnetic backing layer of NiFe or CoZrNb, which are representative materials, is first formed as the base layer 12, followed by continuously stacking a recording magnetic layer 13 of CoPt, SmCo or FePt, which are representative materials having a high Ku value, and a protective layer 14 of C, as a representative material. Then, after removing the product from the sputtering apparatus, through dipping or spin coating of a lubricant layer of PTFE, for example, the thermally-assisted magnetic recording medium of FIG. 2 can be obtained.

On the other hand, in the example of the lengthwise (surface) recording medium, a crystal orientation control layer of Cr or V, for example, may be used as the base layer.

Prior to an experiment for confirming effects of the invention, thermally-assisted magnetic properties of the recording magnetic layer were reviewed with a torque meter and VSM, and its microstructure was reviewed through TEM. Their results are explained below. The average magnetic grain size of the TEM observation level was as fine as approximately 5 nm, the activated volume obtained by measurement of a fluctuation field was close to the substantially physical grain volume, and the medium according to the instant embodiment was confirmed to have an excellent high-density potential. The Ku value at the room temperature was $2.5 \times 10^7$ erg/cc, which is sufficiently high, and this demonstrates that the room-temperature KuV/kT has a sufficient thermal agitation resistance around 100. The room-temperature Hc0 value was as high as about 25 kOe, and considering from 10 kOe as the simulation value of the recording magnetic field, recording at the room temperature was determined to be impossible. Thermal characteristics of Hc0 degraded substantially linearly from the temperature to a high temperature, and the film temperature indicating 10 kOe as Hc0 was around 250° C.

Using the structure of FIG. 2, the instant embodiment was carried out in the following procedures, and its effects were reviewed. In this example, size of the optical aperture 21 was 200 nm, each side, thickness of the partition 32 (distance from the trailing edge of the aperture 21 to the leading edge of the recording magnetic pole 41) was 20 nm, and length of the recording magnetic pole in the track direction was 150 nm. Although the length of the magnetic pole should be shorter in the above-mentioned class of hundreds of Gpsi, the instant example determined it 150 nm for the purpose of making clear the effects of the invention. It will be needless to say that, in order to clarify the effects of the invention, length of the recording magnetic pole itself is immaterial, but its relation with the minimum magnetic transition distance Bmin is important.

The experiment was such that, while changing the minimum magnetic transition distance Bmin in several ways, values were recorded at a single recording frequency corresponding to the minimum magnetic transition distance, signals immediately after being recorded were reproduced with a GMR (giant magnetoresistive) head located at a trailing side of the recording magnetic pole, and MFP was measured to review changes in ratio between D and Bmin determined by the invention with amplitudes of reproduced signals. MFP measurement was conducted in the following way. In case the rising and the falling of the recording magnetic field are adjusted to be extremely shorter than the time required for the medium to pass under the recording magnetic pole, the time interval between the zero-crossing point of the recording magnetic field (the time when the polarity changes) and the peak value of a reproduced signal (zero-crossing point of a differential signal) corresponds to the value obtained by dividing the distance between MFP and GMR element with the linear velocity. Further, the time required for the medium to move from TE of the recording magnetic pole to the GMR reproducing section corresponds to the value obtained by dividing the physical distance between TE of the recording magnetic pole and the GMR element section with the linear velocity. By multiplying the difference between those two time values by the linear velocity, distance D between the reversing point of magnetization and TE of the recording magnetic pole determined by the instant embodiment can be obtained. D varies with power of light beams, intensity of the recording magnetic field and thermal response of the medium.

Figure 3:
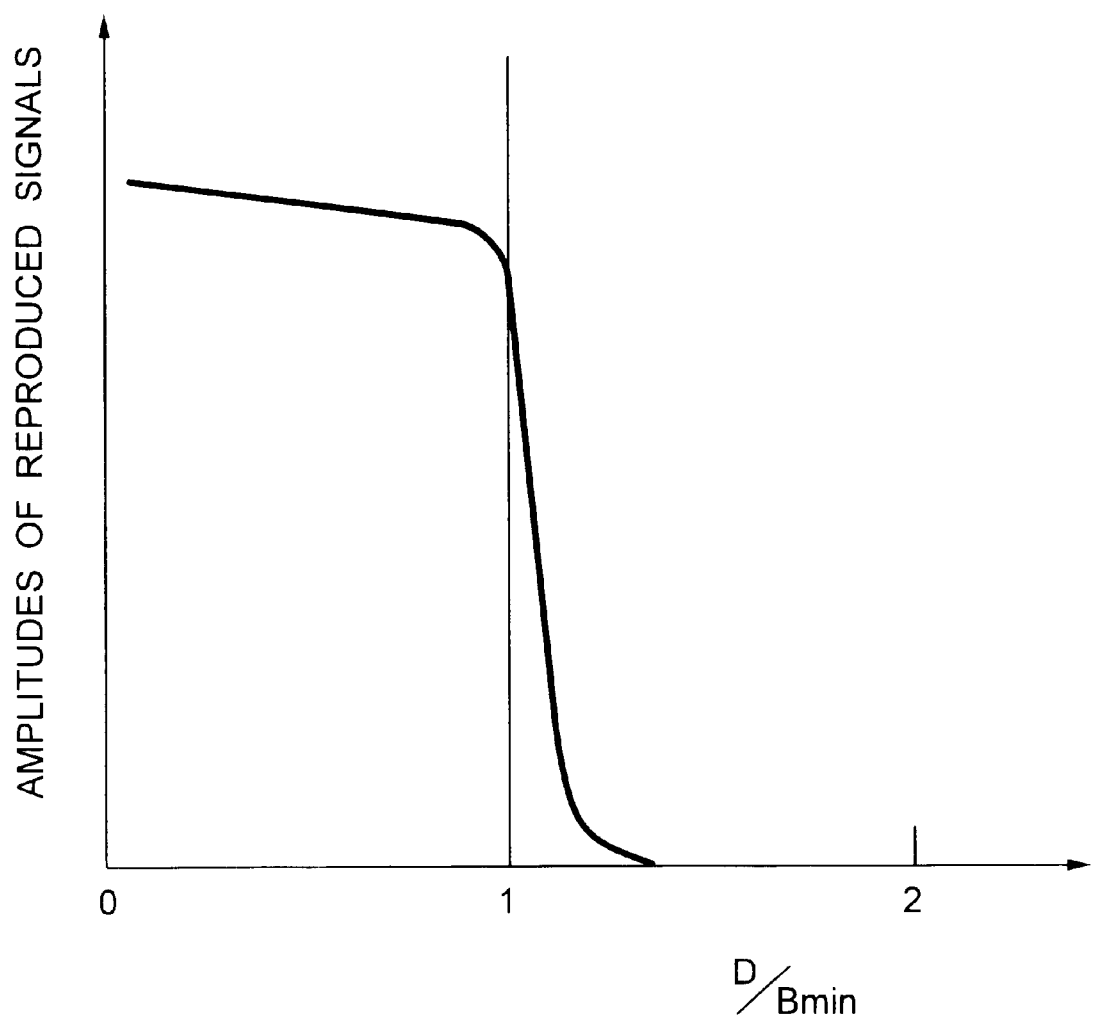
FIG. 3 graphically shows a relation between amplitudes of reproduced signals and D/Bmin.

FIG. 3 graphically shows a relation between amplitudes of reproduced signals and D/Bmin. In the range of D/Bmin<1, amplitudes of signals gradually decrease as D/Bmin increases. This is because the intensity of the medium magnetic field flowing into the GMR reproducing element section moderately decreases with the decrease of Bmin. A sudden decrease in signal amplitude by a decrease ratio much larger than that moderate decrease is observed near D/Bmin−1.

Some tracks recorded by changing Bmin were observed by MFM. As a result, in the range of D/Bmin<1, they were substantially aligned in recording-magnetized direction within a single recording cell. However, when D/Bmin>1, a number of re-reversed magnetic grains were observed within a single recording cell, and a state of magnetization close to the state of demagnetization appeared. This means that, although the magnetization of magnetic grains in the trailing side of the magnetic transition made by MFP maintains the orientation as recorded in the time range where the recording magnetic field is held unchanged in orientation from the recording direction, but once the polarity of the magnetic field is reverted while they are located under the recording magnetic pole, Hw promotes thermal agitation even though Hc0 is larger than Hw, and re-reversal of magnetization is created. Simultaneously, this clearly exhibits effects of the thermally-assisted magnetic recorder according to the instant embodiment.

Still referring to FIG. 3, D is definitely determined when the irradiation intensity of light, recording magnetic field, thermal response of the medium, and other factors are definitely determined and the spatial distribution of light beams in the track width direction is a segment of line vertical to the track. However, if it is curved in the track width direction, the value at the track center and the value at the track edge are different. Also in that case, average D over the track width direction can be defined from reproduction signals according to the above-explained technique.

In the example of FIG. 3, the lower limit of D/Bmin is not observed. However, in case that the magnetic grain size becomes smaller, since Hw functions toward preventing thermal agitation of magnetization after recording in the range of D/Bmin≦1 from MFP to Te of the recording magnetic pole, the lower limit value exists. This lower limit value depends upon the grain size of magnetic grains of the medium and Ku.

As explained above, according to the embodiment, magnetic transition in thermally-assisted magnetic recording can be sharpened, and at the same time, re-reversal by thermal agitation immediately after creation of magnetic transition can be prevented reliably. As a result, recording density can be improved drastically, and stable, highly reliable magnetic recording is made possible.

(Second Embodiment)

Next explained is the second embodiment of the invention.

The thermally-assisted magnetic recorder according to this embodiment has its structural basis in (1) supplying light beams as the heat source and the recording magnetic field from a common surface side of the medium, (2) incorporating the light emitting element and the magnetic recording element to form an integral structure, (3) stacking the light emitting element and the recording magnetic pole sequentially from the upstream side in the medium moving direction, and (4) closely locating the light emitting section and the recording magnetic pole.

(1) By supplying light beams as the heat source and the recording magnetic field from a common surface side of the medium, selective heating of a small area around tens of nm, which is impossible to realize with far-field light, is enabled. (2) By employing the integral structure incorporating the light emitting element and the magnetic recording element, excluding the optical system having a complicated structure and a heavy mass, the head can be operated for high-speed seek, efficiency of the use of light can be increased much higher as compared with a system configured to irradiate light by using a waveguide or a fiber, and a semiconductor laser of tens of mW can be employed. (3) Because of the structure which sequentially stacks the light emitting element and the recording magnetic pole sequentially from the upstream side in the medium moving direction, and (4) the close placement of the light emitting section and the recording magnetic pole, the recording magnetic field can be supplied at the best timing where Hc0 of the medium has been lowered sufficiently.

In addition to the above-mentioned basis structures, the instant embodiment locates the magnetic reproducing element in a unique positional relationship.

That is, in the instant embodiment, the light emitting element, recording magnetic pole and magnetic reproducing element are closely located sequentially from the upstream (leading) side in the medium traveling direction. When assigning Lmag to the length of the recording magnetic pole in the track direction (distance from the leading edge of the recording magnetic pole to the trailing edge), Dmr to the distance from the trailing edge of the recording magnetic pole to the center of magnetic gap of the reproducing element in the track direction, ΔT to the time interval from the moment of reverting the recoding current supplied to the coil crossing the recording magnetic pole for recording magnetic transition on the recording layer of the magnetic recording medium by reverting the recording magnetic field from the recording magnetic pole to the moment for the magnetic reproducing element to detect the reversal of magnetization and output a reproduction signal, and v to the relative velocity between the magnetic recording medium and the recording magnetic pole, the following relation is satisfied.

$$Dmr \leq v \cdot \Delta T \leq Lmag + Dmr$$

When this condition is satisfied, the position on the magnetic recording medium where the flux reversal is recorded falls in the range right under the recording magnetic pole, that is, in the range from the leading edge of the recording magnetic pole to its trailing edge, and the recording magnetic field is applied to the magnetic recording medium while maintaining a constant value until the moment when recording of flux reversal is determined. Therefore, stable, high-speed recording is ensured without inviting demagnetization by thermal agitation before determination of recording.

The instant embodiment is further explained in greater detail with reference to the drawings.

(First Model)

First prepared was a thermally-assisted magnetic head according to the instant embodiment as the first model of the same embodiment, with a relatively wide track width, and its effects were reviewed. This model uses no near-field optical aperture or no converging lens system.

FIGS. 4A and 4B show a thermally-assisted magnetic recorder taken as the instant model, in which FIG. 4A is a plan view of a thermally-assisted magnetic head taken from a medium surface, and FIG. 4B is a sectional view, with the medium involved, taken along the line A–A' of the track direction.

In FIGS. 4A and 4B, the section shown by reference numerals 151 through 154 is the major part of the medium, and all the part shown by the remainder reference numerals is the major part of the thermally-assisted magnetic head.

Components of the head are the semiconductor laser light emitting element section 111 through 119, magnetic recording element section 120 through 127, magnetic reproducing element section 130 through 133, and the protective coat section 104. As shown in the drawings, the light emitting section, magenetic recording element section and magnetic reproducing element section are located in this order from the upstream (leading) side. Here again, the terms "upstream (leading)" and "downstream (trailing)" are used to express that the medium moves with respect to the head from the upstream side to the downstream side for recording and reproduction.

The terms "leading edge" and "trailing edge" are used to specify upstream ends and downstream ends of head-constituting elements (such as light emitting element, optical aperture, recording magnetic pole, reproducing element, and so on) in the track direction. In FIGS. 4A and 4B, elements not directly related to the invention, such as detailed structure of the reproducing element section, structure of the electrode lead-out section, etc. are omitted from illustration for simplicity.

In the configuration of the semiconductor light emitting section shown in FIGS. 4A and 4B, reference numeral 11 denotes a substrate, 112 a buffer layer for lattice matching, such as GaAs layer having a thickness around several $\mu$m, 113 a p-type layer such as p-type GaAs layer having a thickness around 200 nm, 114 a stripe-shaped multi-layered metal electrode such as Ti/Pt/Au multi-layered film having the width of 1 $\mu$m and a total thickness around 100 nm, for example, 115 a p-type cladding layer such as p-type AlGaInP layer having a thickness around 1 $\mu$m, 116 an active layer such as GaInP layer having a thickness around 100 nm, 117 a cavity region in the active layer (light emitting region), 118 an n-type cladding layer such as n-type AlGaInP layer having a thickness around 1 $\mu$m, and 119 an electrode such as AuGe/Au multi-layered film having a thickness around 100 nm.

In the above-shown structure, the light emitting region has a rectangular form, approximately 1 $\mu$m wide and tens of nm thick in the track direction, which corresponds to the thickness of the active layer. As explained later, the light emitting surface 117 and the medium are separated with a spacing of tens of nm. Beam profile on the medium surface was obtained by simulation. As a result, it was an elongated circle approximately 1 $\mu$m long in the track width direction and having a beam diameter ($e^{-2}$-diameter) around 200 nm in the track direction.

Relation between the beam diameter in the track direction and the active layer thickness depends upon the spacing, but when the spacing is tens of nm, the beam diameter is about two times the active layer thickness.

In the construction of the magnetic recording element section shown in FIGS. 4A and 4B, numeral 120 refers to an insulting film such as 100 nm thick $SiO_2$, 121 to an upstream magnetic pole such as 20 nm thick CoNiFe film (its part other than the magnetic pole tip 122 is depressed in FIG. 4A), 122 to a recording magnetic pole tip buried in the light emitting element, which is a unique point of the invention. The tip 122 may be 0.75 $\mu$m wide and 1 $\mu$m deep. Numeral 123 refers to an insulator such as resist frame, 124 to a recording magnetic field generating coil such as 10-turn Cu coil, 125 to a return path magnetic pole such as 1 $\mu$m thick NiFe film, 126 to a connecting portion of the upstream magnetic pole and the return path magnetic pole, and 127 to a smoothing/insulating film such as 500 nm thick $SiO_2$.

In the construction of the magnetic recording element portion of FIGS. 4A and 4B, numeral 130 refers to a upstream shield such as 500 nm thick NiFe, 131 to a reproducing gap such as $SiO_2$ having an inter-shield thickness of 200 nm (with 100 nm between the shield and GMR, namely, reproducing gap), 132 to a GMR reproducing element section such as CoFe/Cu/CoFe/FeMn multi-layered film, and 133 to a downstream shield such 500 nm thick NiFe. Although FIG. 4A does not show, connected to opposite ends of the GMR elements are a hard bias film such as CoPt and a metal electrode film. Numeral 104 denotes a protective film for the entire head, which may be an $Al_2O_3$ film having a thickness of tens of $\mu$m, for example.

In the construction of the medium portion shown in FIGS. 4A and 4B, 151 denotes a magnetic recording layer such as 30 nm thick CoPt—$SiO_2$ vertically magnetized multiparticle thin film, 152 a soft-magnetic base such as 100 nm thick NiFe, 153 a portion heated by light from the light emitting element, 154 a position where magnetic transition is determined in the course of cooling, 155 a recording magnetic flux supplied from the recording magnetic pole across the medium, and 156 a light flux emitted from the edge of the laser light emitting element toward the medium surface. In the medium structure, its substrate, protective film and lubricant film are omitted from illustration.

Figure 5A:
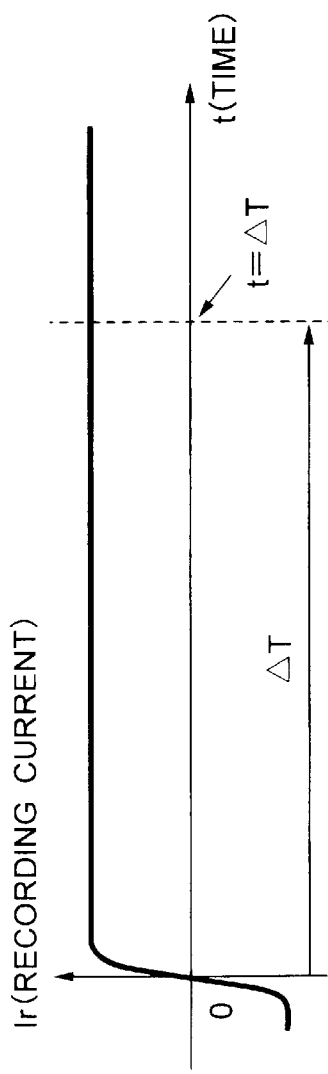
FIG. 5 graphically shows recording/reproducing characteristics of solitary flux reversal in the magnetic recording head shown in FIGS. 4A and 4B, in which dependency of the recording current on time is shown at (a), and dependency of the reproduction voltage obtained from a GMR element on time.
Figure 5B:
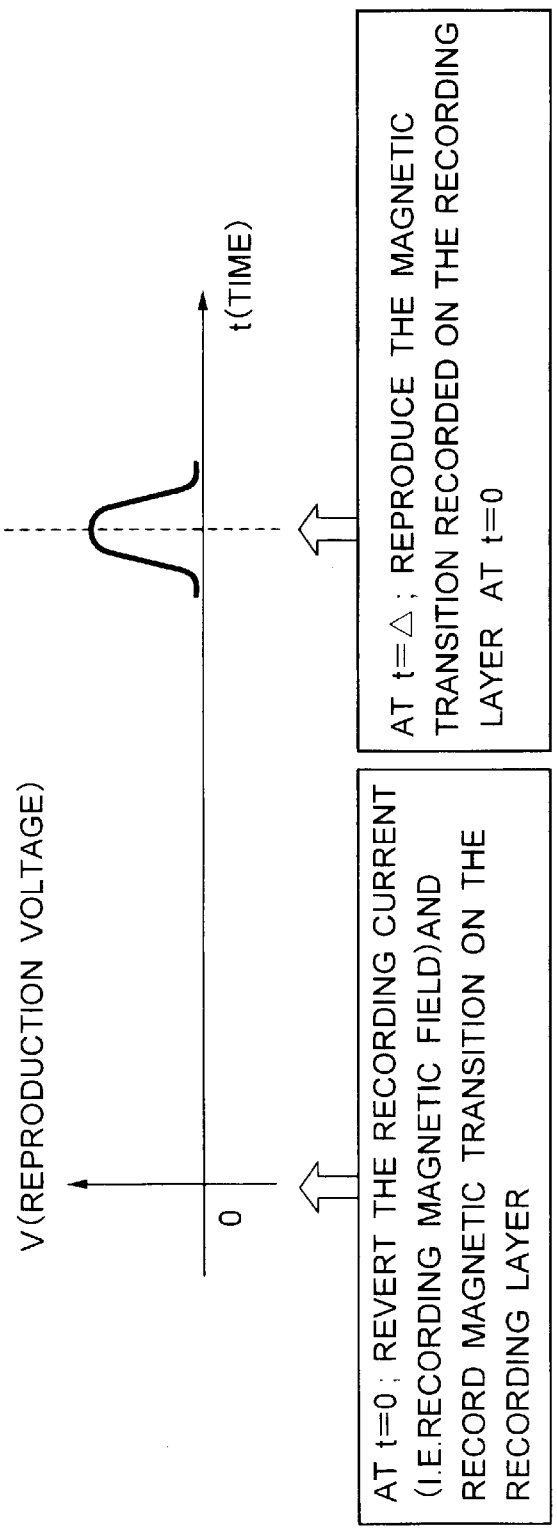

FIG. 5 graphically shows recording/reproducing characteristics of solitary flux reversal in the magnetic recording head shown in FIGS. 4A and 4B, in which dependency of the recording current on time is shown at (a), and dependency of the reproduction voltage obtained from a GMR element on time When assigning Lmag to the length of the recording magnetic pole 122 in the track direction (distance from the leading edge of the recording magnetic pole 122 to the trailing edge), Dmr to the distance from the trailing edge of the recording magnetic pole 122 to the center of the magnetic gap of the reproducing element in the track direction, $\Delta T$ to the time interval from the moment of reverting the recoding current supplied to the coil crossing the recording magnetic pole for recording magnetic transition on the recording layer of the magnetic recording medium by reverting the recording magnetic field from the recording magnetic pole 122 to the moment for the magnetic reproducing element to detect the reversal of magnetization and output a reproduction signal (this time can be measured by using an oscilloscope, for example having a high-frequency band), and v to the relative velocity between the magnetic recording medium and the recording magnetic pole, if the following relation is satisfied $$Dmr \leq v \cdot \Delta T \leq Dmr + Lmag$$

the position on the magnetic recording medium where the flux reversal is recorded falls in the range right under the recording magnetic pole, that is, in the range from the leading edge of the recording magnetic pole to its trailing edge. As a result, the recording magnetic field is applied to the magnetic recording medium while maintaining a constant value until the moment when recording of flux reversal is determined.

Although the model shown here uses a multiparticle medium, it is also possible to use a structure sequentially stacking a continuous magnetic film and a multiparticle magnetic film on a substrate, or a structure sequentially stacking a continuous magnetic film, very thin non-magnetic as thin as several nm (or soft-magnetic amorphous layer of CoZrNb, for example) and a multiparticle magnetic layer on a substrate.

By using such a medium and using thermal properties of exchange coupling force applied between the multiparticle layer and the continuous magnetic layer, it is possible to sharpen the thermal characteristics of the coercive force Hc0 near the recording temperature, which is difficult to obtain with a multiparticle recording layer alone, and increase the activated volume V of the medium recording layer at temperatures near and above the recording temperature. Therefore, even when the linear recording resolution in the track direction is increased (which means an increase of the recording signal frequency), recording magnetization can be made stably. Moreover, even if the beam size is increased larger than the recording track width and adjacent recording tracks are exposed to relatively high temperatures, an increase of V functions to enhance the thermal agitation resistance, and cross erasure can be prevented.

Figure 6:
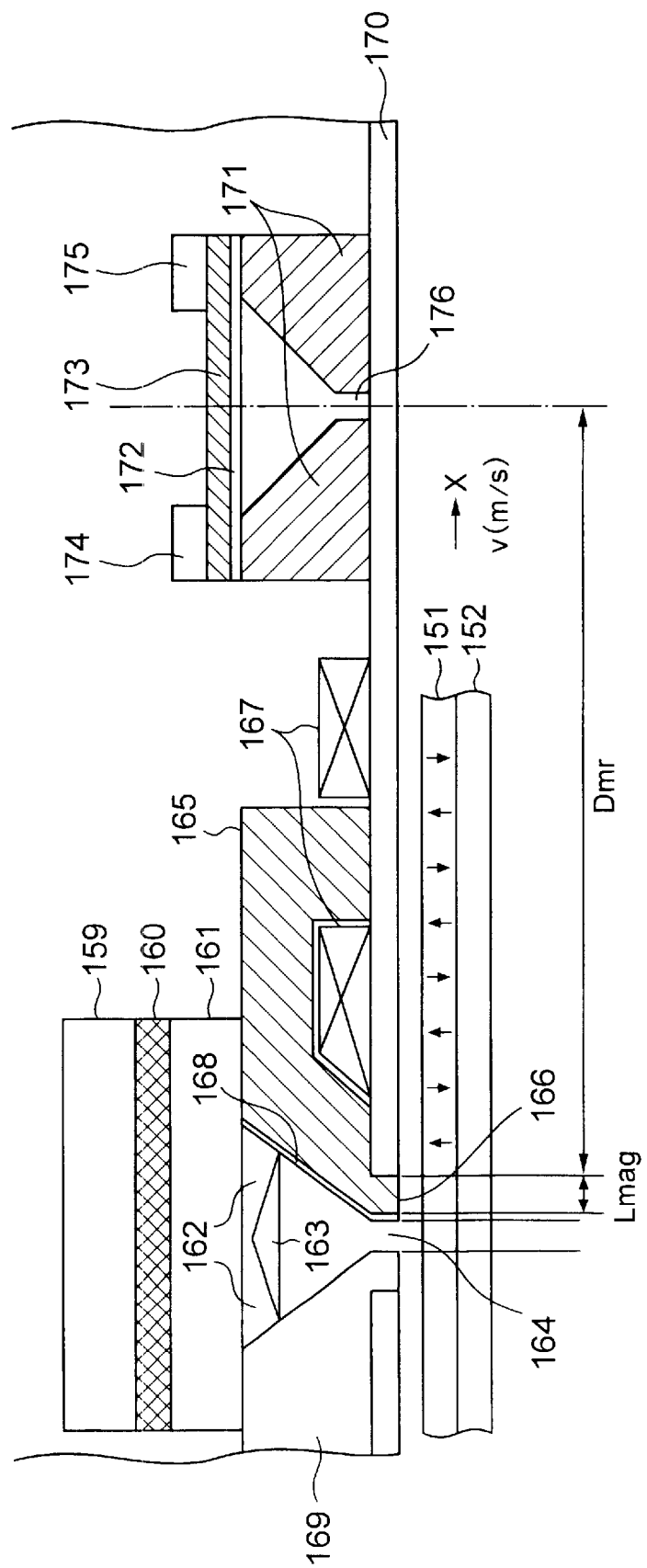
FIG. 6 shows configuration of a major part, namely, only a recording element section and a surface-emitting light emitting element section, of a model of the invention applied to a planar-type thin-film magnetic head.

Configuration of the thermally-assisted magnetic recording head shown in FIG. 6 is explained below along its manufacturing process.

Used as the substrate is a sapphire substrate having a GaAs buffer layer or an ALTIC substrate having grown a relatively thick buffer layer, similarly to the foregoing model. Although FIG. 6 does not show the substrate, it is located on the upper surface of this drawing. That is, the substrate is positioned above the n-type cladding layer, and films are grown from up to down of FIG. 6.

After an n-type junction layer is grown on the substrate, not shown, an n-type AlGaAs/AlAs multi-layered cladding layer 159, InGaAs multi-layered quantum well active layer 160 and p-type GaAs/AlGaAs multi-layered cladding layer 161 are stacked sequentially. The electrode for injecting a current is provided on a side surface of the light emitting element. A Zn diffusion layer, for example, may be used as the electrode. Emission from the active layer occurs in up and down directions of the active layer, and the light is reflected and amplified by two cladding layers toward the active layer for laser oscillation.

The laser light is emitted from the lower surface of the p-type cladding layer 151 toward the recording magnetic pole. After growth of the light emitting element section, an insulating material is buried and its surface is smoothed. Thereafter, the recording element section and the converging lens section are formed. First, a tapered low-refractive section 162 is formed in the emitting section of the light emitting element, an opposite taper is formed in the center of 162, and a high-refractive section 163 is buried in the opposite-tapered portion, thereby to form the converging lens section. Light from the light emitting element section is bent inward at the boundary between the low-refractive section 162 and the high-refractive section 163, and is efficiently guided to the light emitting section 164. Suitable materials for the low-refractive section 162 are $CaF_2$, $MgF_2$, $SiO_2$, etc., and suitable materials for the high-refractive section 163 are ZnS, $TiO_2$, $Si_3N_4$, etc.

The converging lens section 162, 163 are used to improve the efficiency of using light, and it need not be provided when the size of the light emitting section 164 is relatively large and the efficiency of use is relatively high even without the converging lens. Configuration of the converging lens observed from the medium surface may be circular, oval, square or rectangle.

After that, a low-refractive material is again formed in a tapered shape on the high-refractive section 163, and a recording magnetic pole 165 and an opposed tapered portion 169 are made by using side walls of the tapered cone. For making the recording magnetic pole 165, resist frame plating is a suitable technique. When a vertical recording system is employed, the opposed portion 169 is made of a non-magnetic material. When a lengthwise recording system is employed, it is made of the same magnetic material as that of the recording magnetic pole. Since this model employs the vertical recording system, here is used a member having a non-magnetic material such as a high-reflectance film like Cu, Al or Au, for example, on its surface.

In case that temperature is raised significantly by light, a metal having a high melting point. such as W, Mo or Ta is preferably provided. It is also recommended to cover the tapered surface of the recording magnetic pole with a high-reflectance film or a high-melting-point metal film as a thermal insulator 168. In this way, it is possible to prevent an increase of the temperature of the recording magnetic pole by light and thereby prevent a decrease of the recording magnetic field, and simultaneously improve the efficiency of using light. The thermal insulator may be a metal coating alone, but the effect of preventing a temperature increase of the recording magnetic pole can be enhanced by stacking a ceramics member with a low thermal conductivity and a metal film.

After the recording magnetic pole 165 and the opposed portion 169 are formed, a coil hole is formed inside the magnetic pole. Subsequently, a Cu coil portion 167 for supplying a recording current is made by frame plating, for example. After that, the recording magnetic pole tip 166 is made by fine processing such as PEP or FIB. Depending on the size, also the light emitting section 164 is preferably finished by FIB.

By finally coating the protective film 170, the thermally-assisted magnetic head shown in FIG. 6 is completed.

Also in this model, similarly to the first model, when assigning Lmag to the length of the recording magnetic pole 166 in the track direction (distance from the leading edge of the recording magnetic pole 166 to the trailing edge), Dmr to the distance from the trailing edge of the recording magnetic pole 122 to the center of the magnetic gap of the yoke-type reproducing element, composed of a yoke magnetic pole 171, GMR element 173, electrodes 174, 175 and non-magnetic insulating layer 172, in the track direction, $\Delta T$ to the time interval from the moment of reverting the recoding current supplied to the coil crossing the recording magnetic pole 166 for recording magnetic transition on the recording layer 151 of the magnetic recording medium by reverting the recording magnetic field from the recording magnetic pole 122 to the moment for the magnetic reproducing element to detect the reversal of magnetization and output a reproduction signal (this time can be measured by using a high-band oscilloscope, for example), and v to the relative velocity between the magnetic recording medium and the recording magnetic pole, if the following relation is satisfied $$Dmr \leq v \cdot \Delta T \leq Dmr + Lmag$$

stable high-speed recording can be realized.

As explained above in detail by way of the first and second models, the instant embodiment can provide a sufficiently high thermal agitation resistance near the room temperature to a low-noise multiparticle medium having an extremely small grain size required for high-density recording and reproduction, and can simultaneously reduce the required intensity of magnetic field for flux reversal of the medium by irradiation of light in the recording magnetic field applying section, thereby to realize high-sped recording with a practical recording head.

Additionally, by employing the integral structure of the light emitting element and the recording/reproducing elements, the embodiment can provide a compact, light thermally-assisted magnetic recording head and thereby enables high-speed seek operation and provides the head and the drive economically.

(Third Embodiment)

Next explained is the third embodiment of the invention.

The thermally-assisted magnetic recorder according to this embodiment also has its structural basis in (1) supplying light beams as the heat source and the recording magnetic field from a common surface side of the medium, (2) incorporating the light emitting element and the magnetic recording element to form an integral structure, and (3) stacking the light emitting element and the recording magnetic pole sequentially from the upstream side in the medium moving direction. Another basic feature of the instant embodiment lies in (4) closely locating the light emitting section and the recording magnetic pole. (1) By supplying light beams as the heat source and the recording magnetic field from a common surface side of the medium, selective heating of a small area around tens of nm, which is impossible to realize with far-field light, is enabled. (2) By employing the integral structure incorporating the light emitting element and the magnetic recording element, excluding the optical system having a complicated structure and a heavy mass, the head can be operated for high-speed seek, efficiency of the use of light can be increased much higher as compared with a system configured to irradiate light by using a waveguide or a fiber, and a semiconductor laser of tens of mw can be employed. (3) Because of the structure which sequentially stacks the light emitting element and the recording magnetic pole sequentially from the upstream side in the medium moving direction, and (4) the close placement of the light emitting section and the recording magnetic pole, the recording magnetic field can be supplied at the best timing where Hc0 of the medium has been lowered sufficiently.

More specifically, when distance between the trailing edge of the light emitting section and the leading edge of the recording magnetic pole is Dth, and length of the light emitting section in the track direction is L, the instant embodiment is configured to satisfy Dth≦4L.

A preferable means (4) for closely locating the light emitting section and the recording magnetic pole is to employ a structure in which the recording magnetic pole is buried in a downstream side of the laser light emitting element when viewed from the medium surface. That is, when the medium runs in confrontation with the head, it first meets the light emitting element and then the recording magnetic pole. In a structure locating the cladding layer in a downstream (trailing) side of the light emitting element, the magnetic pole may be buried directly in the cladding layer. Alternatively, the light emitting surface may be recessed from the plane of the recording magnetic pole, and the recording magnetic pole may be buried in the recess portion. This is similarly applicable also in a structure locating the active layer in a downstream side. That is, it is sufficient that the recording magnetic pole tip is buried in a layer located in the trailing edge side of the light emitting element when viewed from the medium surface.

Definition of the trailing edge position of the light emitting section means the position of the trailing edge of the active layer in case that the cladding layer is located in a trailing side, and it means the end position of the active layer in case that the active layer is located in the track direction. Distance between the above-defined position and the leading edge of the recording magnetic pole tip is Dth. Length L of the light emitting section in the track direction corresponds to the length of the light emitting section, and it may be substantially equal to the thickness of the active layer of the light emitting element.

In case that the active layer is located in the trailing side, L is the width of the light emitting section from the active layer. In case that the emission outlet of the surface-emitting element is stacked on the recording magnetic pole, L is the length in the track direction of the light emitting section located adjacent to the recording magnetic pole.

On the other hand, in a configuration using near-field light (evanescent light), some structures are employable. A representative configuration is to cover the emitting surface of the semiconductor laser with a reflection film, thereafter open a fine hole (optical aperture) of a size from tens of nm to hundreds of nm in the emitting surface, and form near-field light there. In this configuration, if the size of the fine hole is decreased, efficiency of using light degrades. Therefore, as the recording density increases, required power of the light source increases. However, it is simplest in structure, and the head can be provided inexpensively. another configuration is also applicable, in which light is guided in a tapered form from the emission outlet of the surface-emitting element and the fine hole is provided adjacent to the recording magnetic pole.

In a configuration using the fine hole, Dth<4L is preferably satisfied where Dth is the distance between the trailing edge of the fine hole and the leading edge of the recording magnetic pole, and L is the length of the fine hole in the track direction. In case of Dth>4L, the medium temperature heated by irradiation of light already decreases when the medium moves and reaches under the recording magnetic pole, and effective recording is difficult.

The thermally-assisted magnetic recorder according to the invention is not limited in sort of the medium, and can employ either a medium using a multiparticle thin film as its recording layer, or a medium using a continuous magnetic film as the recording layer.

The instant embodiment is further explained in detail, referring to some models.

(First Model)

First prepared was a thermally-assisted magnetic head according to the instant embodiment as the first model of the same embodiment, with a relatively wide track width, and its effects were reviewed. This model uses no near-field optical aperture or no converging lens system.

Figure 7:
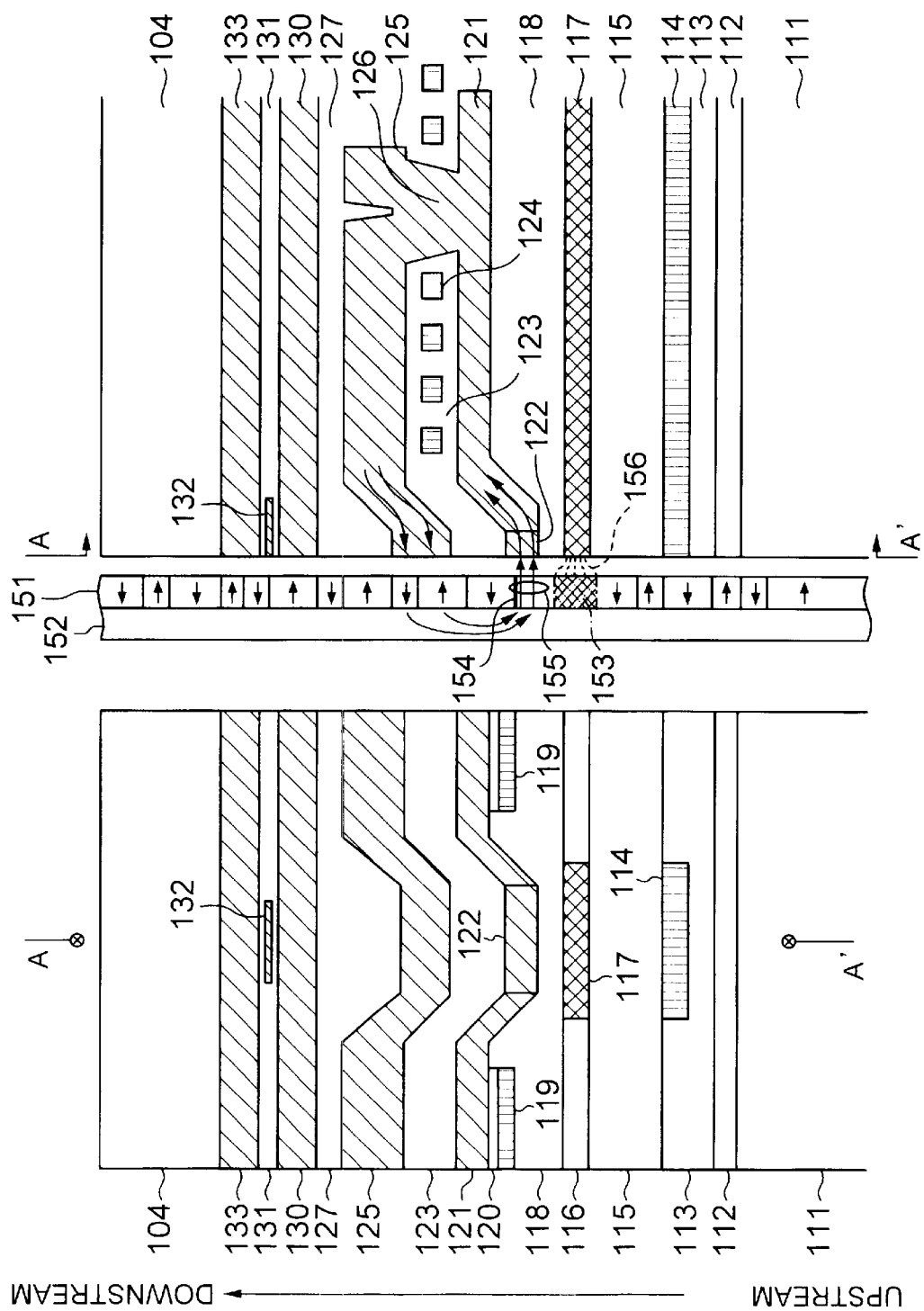

FIGS. 7A and 7B show a thermally-assisted magnetic recorder taken as the instant model, in which FIG. 7A is a plan view of a thermally-assisted magnetic head taken from a medium surface, and FIG. 7B is a sectional view, with the medium involved, taken along the line A–A' of the track direction.

In FIGS. 7A and 7B, the section shown by reference numerals 151 through 154 is the major part of the medium, and all the part shown by the remainder reference numerals is the major part of the thermally-assisted magnetic head. Components of the head are the semiconductor laser light emitting element section 111 through 119, magnetic recording element section 120 through 127, magnetic reproducing element section 130 through 133, and the protective coat section 104.

As illustrated, in the head according to the instant embodiment, the light emitting section, recording element section and magnetic recording element section are located in this order from the upstream (leading) side. The terms "upstream (leading)" and "downstream (trailing)" are used to express that the medium moves with respect to the head from the upstream side to the downstream side for recording and reproduction. The terms "leading edge" and "trailing edge" are used to specify upstream ends and downstream ends of head-constituting elements (such as light emitting element, optical aperture, recording magnetic pole, reproducing element, and so on) in the track direction. In FIGS. 7A and 7B, elements not directly related to the invention, such as detailed structure of the reproducing element section, structure of the electrode lead-out section, etc. are omitted from illustration for simplicity.

In the configuration of the semiconductor light emitting section shown in FIGS. 7A and 7B, reference numeral 11 denotes a substrate, 112 a buffer layer for lattice matching, such as GaAs layer having a thickness around several $\mu$m, 113 a p-type layer such as p-type GaAs layer having a thickness around 200 nm, 114 a stripe-shaped multi-layered metal electrode such as Ti/Pt/Au multi-layered film having the width of 1 $\mu$m and a total thickness around 100 nm, for example, 115 a p-type cladding layer such as p-type AlGaInP layer having a thickness around 1 $\mu$m, 116 an active layer such as GaInP layer having a thickness around 100 nm, 117 a cavity region in the active layer (light emitting region), 118 an n-type cladding layer such as n-type AlGaInP layer having a thickness around 1 $\mu$m, and 119 an electrode such as AuGe/Au multi-layered film having a thickness around 100 nm.

In case of the above-shown model, the light emitting region has a rectangular form, approximately 1 $\mu$m wide and tens of nm thick in the track direction, which corresponds to the thickness of the active layer. As explained later, the light emitting surface 117 and the medium are separated with a spacing of tens of nm. Beam profile on the medium surface was obtained by simulation. As a result, it was an elongated circle approximately 1 $\mu$m long in the track width direction and having a beam diameter around 200 nm in the track direction. Relation between the beam diameter in the track direction and the active layer thickness depends upon the spacing, but when the spacing is tens of nm, the beam diameter is about two times the active layer thickness.

In the construction of the magnetic recording element section shown in FIGS. 7A and 7B, numeral 120 refers to an insulting film such as 100 nm thick SiO$_2$, 121 to an upstream magnetic pole such as 20 nm thick CoNiFe film (its part other than the magnetic pole tip 122 is depressed in FIG. 4A), 122 to a recording magnetic pole tip buried in the light emitting element, which is a unique point of the invention. The tip 122 may be 0.75 $\mu$m wide and 1 $\mu$m deep. Numeral 123 refers to an insulator such as resist frame, 124 to a recording magnetic field generating coil such as 10-turn Cu coil, 125 to a return path magnetic pole such as 1 $\mu$m thick NiFe film, 126 to a connecting portion of the upstream magnetic pole and the return path magnetic pole, and 127 to a smoothing/insulating film such as 500 nm thick SiO$_2$.

In the construction of the magnetic recording element portion of FIGS. 7A and 7B, numeral 130 refers to a upstream shield such as 500 nm thick NiFe, 131 to a reproducing gap such as SiO$_2$ having an inter-shield thickness of 200 nm (with 100 nm between the shield and GMR, namely, reproducing gap), 132 to a GMR reproducing element section such as CoFe/Cu/CoFe/FeMn multi-layered film, and 133 to a downstream shield such 500 nm thick NiFe. Although FIG. 7A does not show, connected to opposite ends of the GMR elements are a hard bias film such as CoPt and a metal electrode film. Numeral 104 denotes a protective film for the entire head, which may be an Al$_2$O$_3$ film having a thickness of tens of $\mu$m, for example.

In the construction of the medium portion shown in FIGS. 7A and 7B, 151 denotes a magnetic recording layer such as 30 nm thick CoPt-SiO$_2$ vertically magnetized multiparticle thin film, 152 a soft-magnetic base such as 100 nm thick NiFe, 153 a portion heated by light from the light emitting element, 154 a position where magnetic transition is determined in the course of cooling, 155 a recording magnetic flux supplied from the recording magnetic pole across the medium, and 156 a light flux emitted from the edge of the laser light emitting element toward the medium surface. In the medium section of FIGS. 7A and 7B, its substrate, protective film and lubricant film are omitted from illustration.

Next explained is a method for fabricating the thermally-assisted magnetic recording head and the medium having the above-explained structures.

First of all, thin films forming the head are preferably grown such that the substrate is located in the upstream side. Its reason lies in that the growth temperature of the semiconductor light emitting element is higher than the growth temperature of the magnetic recording/reproducing element. That is, if the semiconductor light emitting element is grown after the magnetic recording/reproducing element, the magnetic recording/reproducing element will be deteriorated by the growth temperature of the semiconductor light emitting element.

Another reason thereof lies in that the substrate can be used as a slider and enables employment of a secondary processing equivalent to the existing magnetic head.

From the viewpoint of optimizing crystallographic growth of the semiconductor light emitting element, it is recommended to use a GaAs substrate, or a sapphire substrate having formed a GaAs buffer layer thereon, as the substrate 111 AlGaAs, in case of an AlGaAs-series or AlGaInP-series red light emitting element. In case of an InGaN-series blue light emitting element, for example, a sapphire substrate or a SiC substrate, having formed a GaN buffer layer thereon, is preferably used. However, in order to enable slider processing and ensure a reliable motion as a slider, a sapphire substrate or an ALTIC substrate, used in existing magnetic heads, is preferably used.

In case of using GaAs as the substrate for growth, the substrate may be thinned after making the thin-film element section and thereafter bonded to an ALTIC substrate so as to deliver it to later steps. In case of using an ALTIC substrate, a buffer layer for lattice alignment is preferably stacked thick.

Explained below is an example about steps for fabricating the semiconductor light emitting section.

Using a sapphire substrate as the substrate 111, a lattice-aligning buffer layer such as GaAs layer, several μm thick, for example, is grown by MOCVD (metal-organic chemical vapor deposition).

After that, a p-type layer such as p-type GaAs layer having a thickness around 200 nm is grown again by MOCVD.

Thereafter, for the purpose of defining the cavity width of the active layer (width of the laser emitting section), a stripe-shaped groove is formed in the p-type GaAs layer by etching, and a stripe-shaped multi-stacked metal electrode, such as Ti/Pt/Au multi-layered film 114 having the width of 1 μm and a total thickness around 100 nm, is formed in the groove by sputtering.

After removal of a resist, the surface is smoothed and cleaned by CMP (chemical mechanical polishing). Then, a p-type cladding layer, such as 1 μm thick p-AlGaInP layer 115, for example, is grown by MOCVD here again. At that time, the p-type cladding layer does not grow directly on the metal electrode 114, but lateral diffusion growth occurs from the electrode end portion, and which results in forming a flat-shaped p-type cladding layer 115 uniformly on the p-type GaAs layer 113 and the electrode 114.

Subsequently, the active layer, such as 100 nm thick GaInP layer 116, is grown by MOCVD, and an n-type cladding layer such as 1 μm thick n-type AlGaInP layer 118 is stacked successively by MOCVD.

After that, a resist mask is formed on the n-type cladding layer, and a stripe-shaped electrode such as 100 nm thick AuGe/Au multi-layered film is buried in a portion offset from right above the cavity section. The electrode 119, as shown in FIG. 7A, may be disposed either symmetrically above the cavity section or at only one side thereof. That is, the electrode 119 may be provided in any location provided that current injection to the cavity section of the active layer is ensured.

Heretofore, an example of the method of fabricating the semiconductor light emitting section has been explained.

Next explained is an example of a process for fabricating the magnetic recording element section.

For insulation between the downstream electrode of the semiconductor element section and the upstream recording magnetic pole film, an insulating film 120 is formed. This may be made by puttering $SiO_2$ by maintaining a resist mask after burying the electrode 119 in the final step of the process for making these miconductor element. Alternatively, $SiO_2$ may be stacked uniformly after making a buried portion of the upstream magnetic pole 121 into the downstream cladding layer 118. In this case, there is obtained a structure in which a $SiO_2$ continuous film is formed in the upstream side of the upstream magnetic pole film 121 in FIG. 7A.

It is also possible to use the upstream magnetic pole as the downstream electrode of the semiconductor light emitting element without providing the insulating film. In this case, the electrode 119 need not be made separately. In case of using the upstream magnetic pole film as the downstream electrode of the semiconductor light emitting element, a current can be efficiently injected to the cavity portion of the active layer. However, for the purpose of ensuring reliable adhesion and electrical connection, it is preferable to provide the metal electrode 119 and uniformly coat $SiO_2$ adjacent to the upstream magnetic pole.

In any of those structures, the point of the instant embodiment lies in burying the upstream magnetic pole into the downstream cladding layer. Regarding the way of burying, here is explained an example employing a configuration of uniformly making a $SiO_2$ coating adjacent to the upstream side of the upstream magnetic pole.

After the electrode 119 is buried, a resist is made in a reverted form from that used to make the electrode 119, and the cladding layer 118 is etched. The portion of the recording magnetic pole section 122 is vertically etched, and the tip of the upstream magnetic pole other than 122 is processed by taper etching or isotropic etching. The purpose of vertical etching of the recording magnetic pole section lies in sharpening the spatial distribution of the recording magnetic field, and the purpose of the taper etching of the portion other than the recording magnetic section lies in efficiently concentrating the magnetic flux onto the recording magnetic pole section.

In the case where the recording magnetic pole tip 122 having the tip width of 0.75 μm and the depth of 1 μm is formed, the maximum etching width on the downstream side surface of the downstream cladding layer is around 2 μm in FIG. 7A, and the etching depth of the downstream cladding layer (depth in the direction vertical to the medium surface) is around 2 through 3 μm in FIG. 7B. As a result of partial etching of the cladding layer, light is partly scattered near the emission outlet, and the emission efficiency deteriorates. However, since the full length of the cavity portion (distance in the depth direction) is from tens to hundreds of μm, influences of scattering are not large. Further, as explained later, the higher the recording density, the smaller the influences from scattering of light, because the etched portion decreases.

In this example, distance Dth between the trailing edge of the light emitting section 117 and the leading edge of the recording magnetic pole tip 122 was changed in the range from 50 nm to 1 μm. In case of 1 μm, the cladding layer does not undergo etching. Distant Dth may be controlled by the etching time upon etching the tip of the cladding layer. However, for the purpose of enhancing the accuracy, a $SiO_2$ film, for example, is preferably coated as a distance defining film after etching to the active layer surface. In this case, an appropriately etchant for the cladding layer is preferably selected so as to adjust the etching ratio between the cladding layer and the active layer such that the active layer functions as an etching stopper.

The upstream magnetic pole film 21 was made in the etched portion of the cladding layer, thus made, by using frame plating technique. Usable as the plating seed layer is a Ni or NiFe sputtering film. Subsequently, after the Cu coil 124 and the insulating member 123 portion are made by frame plating, here again, an opening 125 is made, and the downstream magnetic pole (return path) 126 is next made by frame plating. The return path is made such that the area of its medium-side surface is wider than that of the recording magnetic pole tip 122, thereby to prevent concentration of the magnetic flux onto the medium in the return path.

Finally, a smoothing/insulating film 127 is coated by sputtering and smoother by CMP to complete the recording element section.

As explained above, the characteristic structure of the thermally-assisted magnetic recording head according to the instant embodiment, which closely locates the light emitting element portion and the recording element portion, is completed.

Next formed on the smoothing/insulating film 127 is the reproducing element portion.

An upstream shield 130 is made by plating or sputtering, and an upstream insulating film with a thickness around 100 nm is formed thereon. Further, a GMR film portion 132 is formed and processed by ion milling technique, for example, to make an island of GMR at the tip. Using the island as a mask, a hard bias film and an electrode film are formed by sputtering to make the major part of the reproducing element. In this example, the reproducing track width was adjusted to 0.6 µm. Subsequently, a downstream insulating film, approximately 100 nm thick, and a downstream shield film 133 were formed to complete the reproducing element portion. Finally, after coating a protective film 104, through external leading of the electrode, although not shown in FIGS. 7A and 7B, cutting of the substrate, slider processing of the sapphire substrate, connection of lead wires and mounting to a suspension, the thermally-assisted magnetic recording head according to the invention was obtained.

The head obtained in this way was set on a spin-stand-type magnetic recording/reproduction evaluating system for actual confirmation test of the invention, which will be explained later.

Next explained is a process for fabricating the medium used to carryout the instant embodiment. In this example, a vertically-magnetized, multiparticle film with a soft-magnetic base layer was used as the medium.

On a glass substrate, a 100 nm thick NiFe film as the soft-magnetic base layer 152, a 30 nm thick $CoPt-SiO_2$ vertically-magnetized, multiparticle thin film 151 thereon, and a 10 nm thick C protective film were continuously formed by sputtering, and a lubricant was coated. After that, surface projections were removed by a tape-vanishing, and the medium was set on a spin-stand-type magnetic recording/reproducing evaluating system together with the above-explained thermally-assisted magnetic recording head.

This example used as its recording layer a so-called granular film of a structure containing CoPt magnetic grains dispersed in a $SiO_2$ matrix for easier control of the grain size and quantity of the magnetic grains. Upon making the $CoPt-SiO_2$ recording layer, a CoPt target and a $SiO_2$ target were used in a double simultaneous sputtering mode, and the grain size and the contained ratio of CoPt were controlled by changing sputtering inputs to individual targets. It is also possible to apply a bias to the substrate during sputtering so as to control the grain size alone independently with the bias power.

Prior to conducting the recording/reproducing test, composition, microstructure and magnetic properties of the medium according to the invention were investigated separately. The contained ratio of CoPt in the $CoPt-SiO_2$ film made under typical conditions was 60 vol %. Further, as a result of analysis of the microstructure, CoPt and $SiO_2$ were confirmed to exist separately and form a structure containing CoPt grains dispersed in the $SiO_2$ matrix. Average grain size of the CoPt grains was approximately 7 nm.

For measurement of the magnetic properties, thermal characteristics were examined by using a torque meter and VSM at different temperatures included in a range of liquid nitrogen temperature to 500° C., respectively. The typical magnetic characteristics measured at the room temperature were: Ku: $4.5 \times 10^6$ erg/cc, Hc: 5 kOe, and Ms: 400 emu/cc. The particles having the mean size were found to have a KuV/kT value of about 125 at the room temperature (300 K). Thus, the medium used in this example can be said to show an ambient thermal agitation at a temperature near the room temperature. The magnetic characteristic varied as a function of the temperature and was found to monotonously decrease in a direction from a low temperature to a high temperature.

Figure 8:
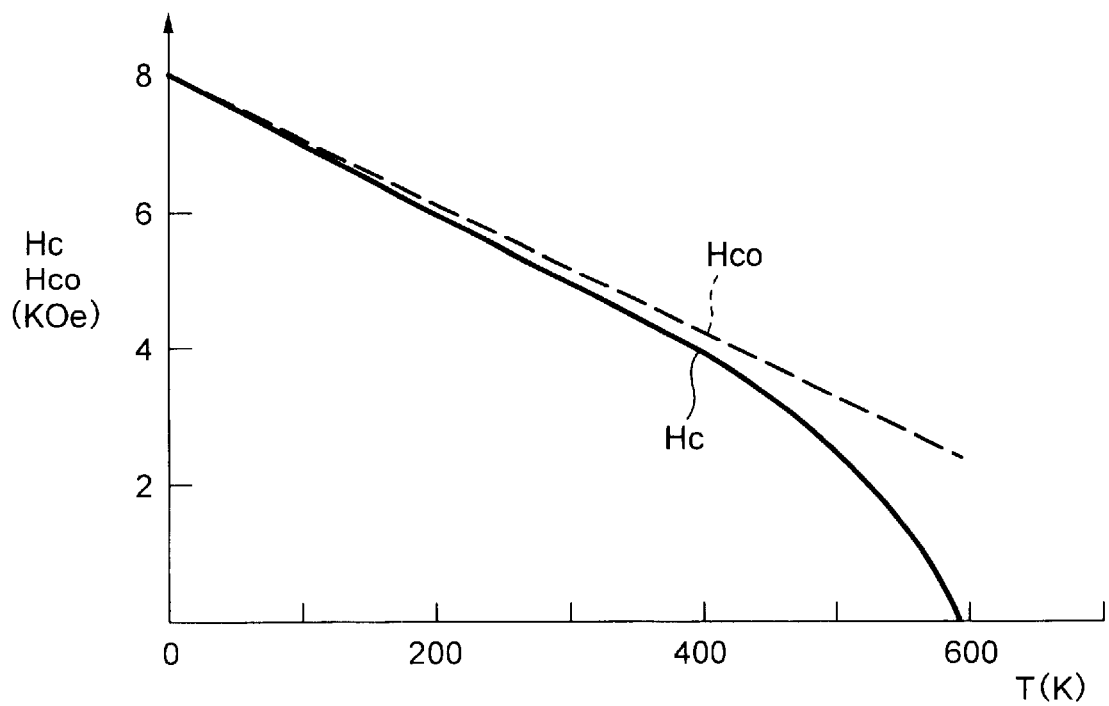
FIG. 8 graphically shows how Hc actually measured with VSM and Hc0 estimated by using Shallock's expression depend upon temperature.

Referring now to FIG. 8, there is illustrated a graph of the dependence on the temperature of Hc measured using VSM and that of Hc0 estimated using the Sharrock's expression. Since VSM takes a time of about 10 minutes for loop measurement, Hc measured by VSM is a coercive force after the magnetic field is subjected to a thermal agitation for about 10 minutes at the temperature. On the other hand, the coercive force Hc0 associated with the recording is a magnetic field required for a high speed magnetic transition for about 10 ns during actual recording by the head. It means a magnetic field required for a magnetic transition within a time for which it will be little influenced by a thermal agitation.

In a temperature range in which the magnetic field will be little affected by the thermal agitation within a time of about 10 minutes, Hc and Hc0 will nearly (completely when K is zero) coincide with each other, but in a high temperature range, Hc will be considerably lower than Hc0. What is important in the thermally-assisted magnetic recording is not Hc but Hc0. So, Hc0 was determined based on a combination of the measurement with VSM and Sharrock's expression.

As a result, Hc0 measured at a temperature near the room temperature was 5.2 kOe, which is nearly the same as Hc, but in a temperature range higher than 100° C. equivalent to the temperature during the thermally-assisted recording, Hc was considerably higher than Hc0. The saturation magnetic field of the medium required for the recording should preferably be nearly double Hc0. However, since the saturation field is nearly proportional to Hc0, the present embodiment will be described below using Hc0 as the necessary magnetic field for the thermally-assisted magnetic recording. Note that when K is zero, the anisotropic energy Ku0 was $8 \times 10^6$ erg/cc and saturation magnetization Ms0 was 600 emu/cc. Since the CoPt content in the layer was 60% by volume, the net magnetization Isb was 1000 emu/cc. When the high temperature-side Hc0 was extrapolated, the Curie point was estimated to be five hundreds and several tens of ° C. and the temperature at which Hc0 decreased to 2 kOe was estimated to be about 300° C.

The medium having the above-mentioned magnetic characteristic was set along with the thermally-assisted magnetic thermal characteristic head in a spin-stand type magnetic recording/reproducing evaluation apparatus, the medium was moved at the rate of 10 m/s in relation to the head, and recording and reproduction were tested with a relatively low linear density equivalent to a solitary wave output of 100 kfci to examine the read output voltage. Optical output power as a parameter was changed by way of the current injected to the light emitting element, and recording magnetic field intensity as another parameter was changed by way of the current supplied to the recording coil.

Figure 9A:
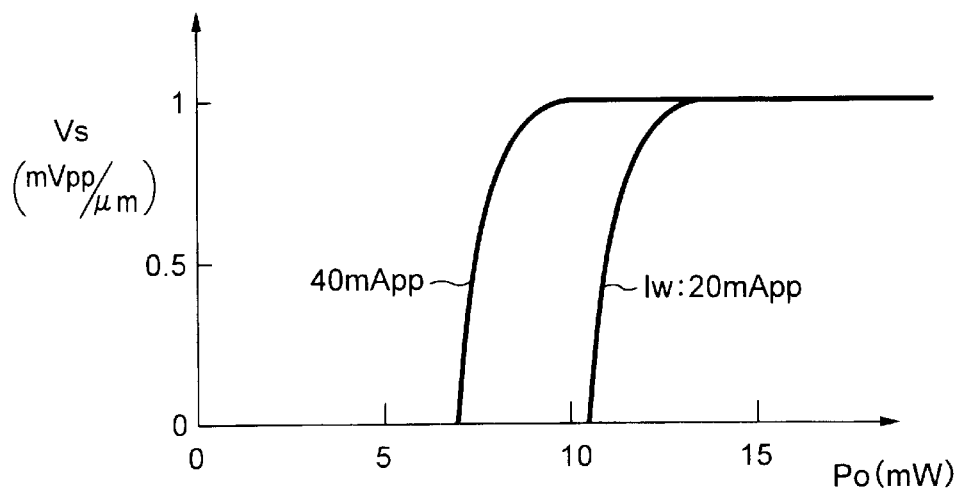
FIG. 9A graphically shows a relation between optical output power Po and reproduction output voltage Vs of GMR per 1 μm of the track width, and FIG. 9B graphically shows a relation between supplied current Iw to the recording coil and reproduction output voltage Vs.
Figure 9B:
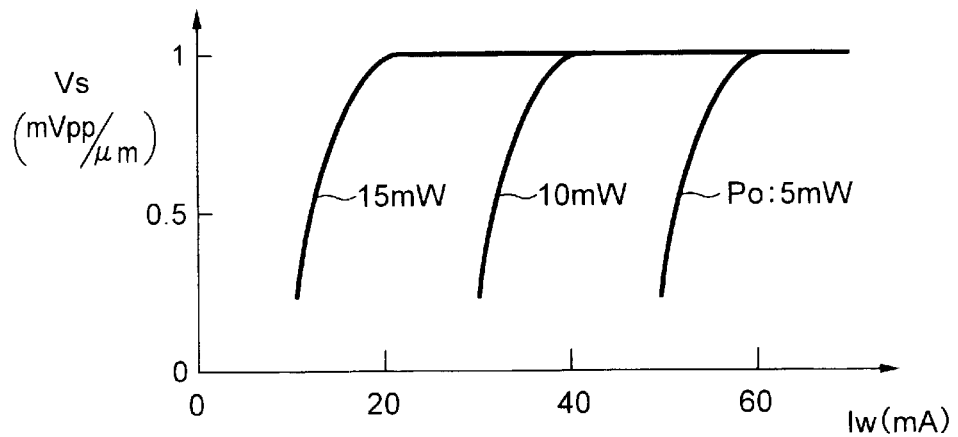
Figure 10:
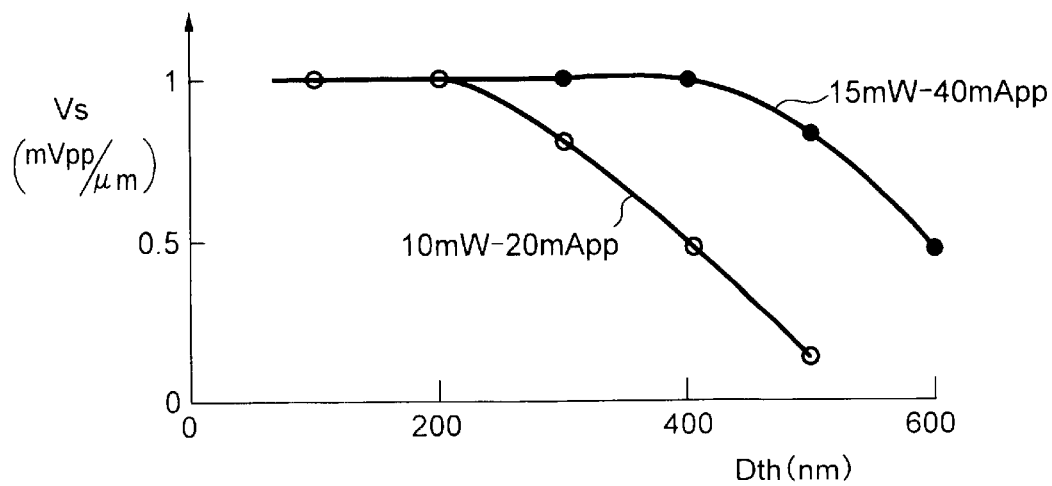
FIG. 10 graphically shows a relation between distance Dth from the trailing edge of the light emitting surface of a light emitting element (117 of FIGS. 7A and 7B) to the recording magnetic pole (122 of FIGS. 7A and 7B) and reproduction output voltage Vs.

FIGS. 9A, 9B and 10 show a result of the evaluation. FIG. 9A is a graph that shows relation between the optical output power Po and GMR reproduced output voltage Vs per 1 µm of the track width. FIG. 9A is a graph that shows relation between the current Iw supplied to the recording coil and the reproduced output voltage Vs. FIG. 10 is a graph that shows relation between the distance Dth from the trailing edge of the emission surface of the light emitting element (117 of FIGS. 7A and 7B) to the leading edge of the recording magnetic pole (122 of FIGS. 7A and 7B) and the reproduced output voltage Vs. Attached to the data curves in these drawings are values of Po and Iw that were changed as parameters.

For a practical magnetic recorder, a recommended value of the current supplied to the recording coil is 60 mA or less, preferably 40 mA or less, or most preferably 20 mA or less. For a practical optical recorder, a recommended value of the optical output is 15 mW or less, or preferably 10 mW or less. Although not shown in FIGS. 9A and 9B, when light was not irradiated, no output was obtained even when the current of 60 mA was supplied to the recording coil.

It will be apparent from FIGS. 9A and 9B that, in the mode configured according to the invention to heat the medium by irradiation of light in the upstream side where the medium passes under the recording magnetic pole, thereby decrease the magnetic field the medium needs for recording, and thereafter execute recording, a sufficiently high reproduced output can be obtained in practical ranges of optical intensity and recording current.

Further data important for the instant embodiment is the data shown in FIG. 10, which relates to Dth defining the relative timing of heating by irradiation of light and application of the recording magnetic field. That is, it is apparent from FIG. 10 that, in case that Dth is set within the beam size of the light spot, a sufficiently high output can be obtained with most preferable values of optical power and recording current, and even when Dth is about double the light spot size, a sufficient reproduced output can be obtained by increasing the power and the supplied current.

In case of Dth>4L, substantially no improvement was observed even when the optical irradiation power and the supplied current were further increased. This means that, under Dth>4L, the recording magnetic field has been undesirably supplied to a region other than the area with decreased Hc0. The light spot size in the track direction is approximately double the thickness of the active layer of the light emitting element as already explained. Therefore, in a structure where the laser light emitting element and the recording magnetic pole are disposed in sequence from the upstream (leading) side in the medium traveling direction, a thermally-assisted magnetic recording head configured to satisfy Dth≦4L is necessary for effective recording, where Dth is the distance between the trailing edge of the emission surface of the light emitting element and the leading edge of the recording magnetic pole.

When the thickness of the active layer is L, since the thickness of the cladding layer of the light emitting element is typically about 1 μm, and has to be at least 500 nm or more, approximately, for laser oscillation, a thermally-assisted magnetic recording head configured to bury the recording magnetic pole in the downstream (trailing) side of the laser light emitting element, when viewed from the medium surface, can be said to be very useful. For the purpose of easier understanding of the result of the above-explained experiment, a recording process according to the invention is explained below with reference to the drawings.

Figure 11A:
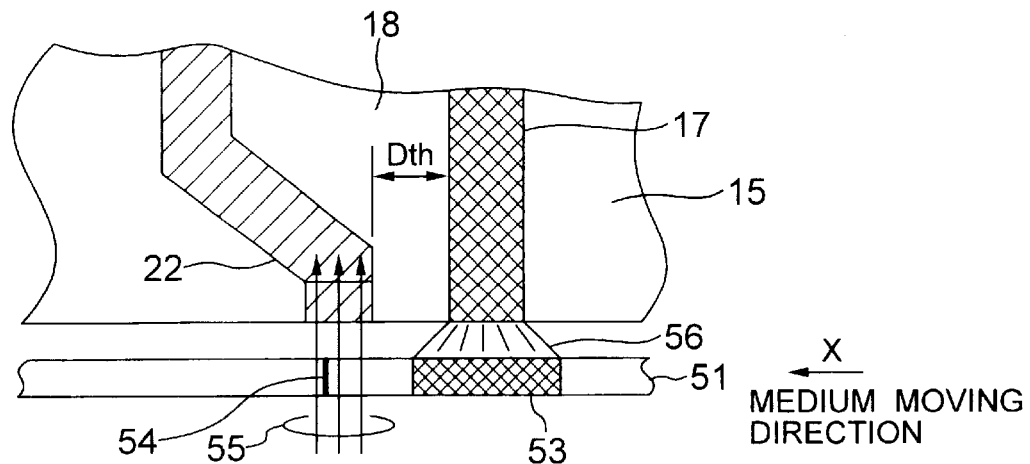
Figure 11B:
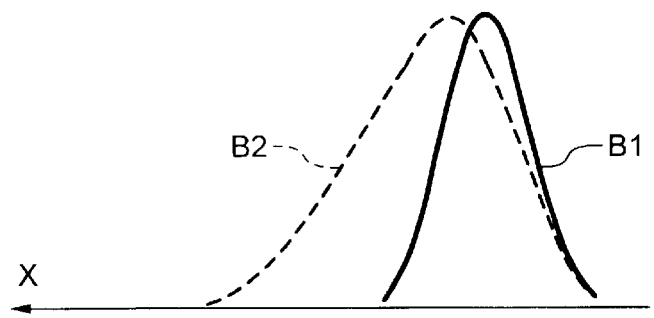
Figure 11C:
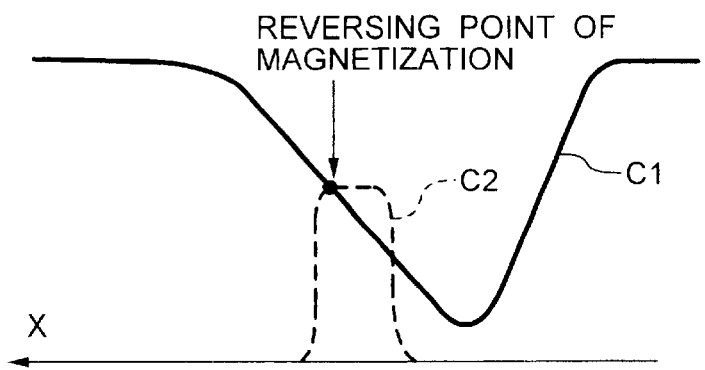

FIGS. 11A through 11C are diagrams that schematically show a recording process using the thermally-assisted magnetic recording head according to the instant embodiment. FIG. 11A is a sectional view of an portion extracted from FIG. 7B and associated with the recording process, FIG. 11B graphically shows a light beam profile on the medium and a temperature distribution on the medium and FIG. 11C graphically shows spatial distribution of Hc0 of the medium and that of the recording magnetic field.

In FIG. 11A, the elements having the same or similar functions as or to those of the elements shown in FIG. 1 will be indicated with the same or similar reference numerals as those in FIG. 1. Reference numeral 115 refers to a leading-side cladding layer of the light emitting element, 117 to a light emitting portion of the active layer, 118 to a trailing-side cladding layer of the light emitting element, 122 to the tip of a recording magnetic pole, 151 to a recording layer of the medium, 153 to a light-incident portion, 154 to a position where magnetic transition is determined, 155 to a recording magnetic flux applied to the medium, and 156 to a light flux released from the light emitting portion 117 of the light emitting element.

The medium is moved relative to the head (from right to left on the sheet of FIG. 11A, the right being the leading side and the left being the trailing side), and the light emitting element is activated to irradiate the light flux 156 from the light emitting portion 117 of the active layer to the recording layer 151. The spatial distribution of light irradiated onto the medium exhibits the Gauss-type distribution as shown at B1 of FIG. 11B. The recording layer is heated by the Gauss-type light. Since the medium moves at a high speed, temperature profile of the recording layer exhibits the form having its peak shifted and trailing to the trailing side, that is, the shape shown at B2 of FIG. 11B. Hc0 profile of the recording layer is determined by the temperature profile B2 and the thermal characteristics of Hc0 shown in FIG. 8, and exhibits the profile shown at C1 of FIG. 11C. The intersection of this C1 profile and the profile C2 of the magnetic flux 155 generated from the recording magnetic pole and crossing the medium is the position 154 where magnetic transition is determined.

It will be understood from FIGS. 11A through 1C, the trough of the curve C1 is deeper as the incident optical power Po is higher, and the crest of the curve C2 is higher as the current Iw supplied to the recording coil is larger. The position where C1 and C2 cross each other varies with the distance Dth from the trailing edge of the emission surface 117 to the leading edge of the recording magnetic pole 122. In case that Dth is 4L or less, when the recording current or optical incident power is high, C1 and C23 have a crossing point. However, if Dth is larger than 4L, C1 and C2 do not have any crossing point, and effective recording will not be possible.

As seen from FIG. 1C, the magnetic transition point in the thermally-assisted magnetic recording according to the present invention differs from that in the conventional magnetic recording and will also lie at other than the trailing edge of the tip of the recording magnetic pole.

In the conventional magnetic recording, since Hc0 of the medium is spatially uniform and a larger recording magnetic field than Hc0 is applied to provide a magnetic transition, the magnetic transition position necessarily lies in the trailing edge of the tip of the recording magnetic pole. In contrast, in the thermally-assisted magnetic recording according to the present invention, the magnetized direction coincides with the direction of the recording magnetic field only between two crossing points of C1 and C2. When the direction of the recording magnetic field is reversed at a time when the medium passes by between C1 and C2, a magnetic transition takes place at that position, therefore, the magnetic transition will not always take place in the trailing edge of the recording magnetic pole but in an arbitrary area between C1 and C2 between the leading and trailing edges.

In FIG. 11A, there are shown only the major components of the recorder and medium in the form of a lateral sectional view. However, it should be noted that when the intensity distribution of the light spot on the medium surface is curved in the direction of the track width, the line between the points of intersection between C1 and C2. Therefore, the magnetic transition provided by the thermally-assisted magnetic recording according to the present invention is curved in the direction of the track width as the case may be. The development of the magnetic transition not always only in the trailing edge of the tip of the recording magnetic pole but also at an arbitrary point between C1 and C2 and occasional curving of the magnetic transition in the direction of the track width (basically following to an isothermal line of the medium) can be counted as the differences of the thermally-assisted magnetic recording according to the present invention from the conventional magnetic recording.

In the foregoing, the basic embodiment of the present invention has been described as selecting a low recording frequency for the purpose of definite examination of the behavior of the signal output. However, it is of course that the present invention can realize a quality thermally-assisted magnetic recording even with a high linear density.

(Second Model)

Next, the present embodiment will be described below by way of its second model. In the first model, the multiparticle layer was used as the medium. The instant embodiment, however, is also advantageous when a continuous magnetic film is used as the medium. In this model, a medium including a film of a ferrimagnetic alloy of an amorphous rare earth and transition metal (R-T film) and used as a magneto-optical recording medium, was experimentally prepared and evaluated similarly to the first embodiment having been described in the foregoing.

The medium, prepared, is constructed by forming on a glass substrate a heat sink layer of an Al alloy, TbFeCo recording layer of TbFeCo, protective layer of C and a lubricant layer in this order. The heat sink layer was provided to adjust the thermal response of the recording layer.

Figure 12:
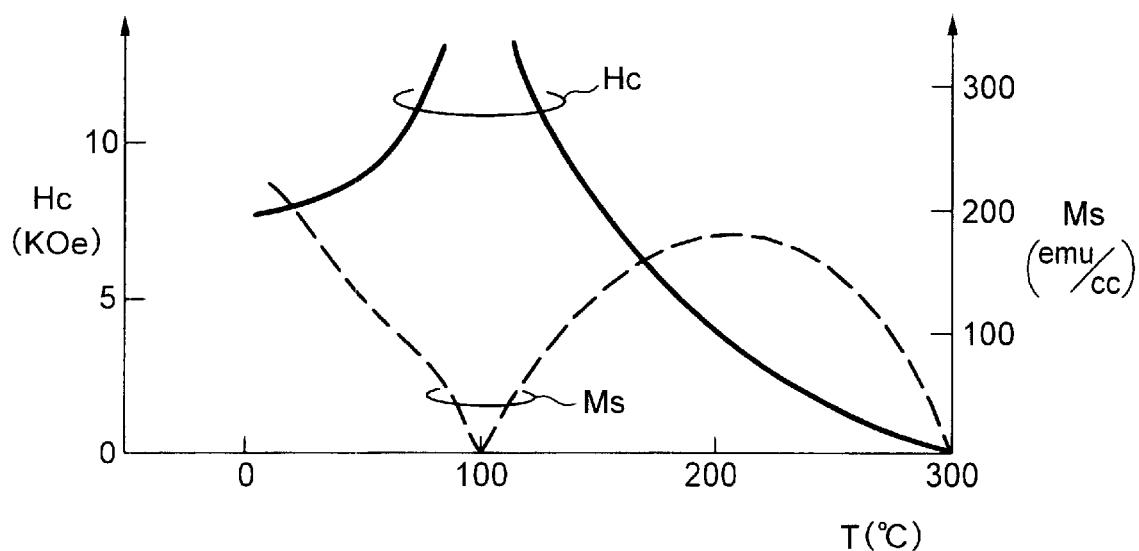
FIG. 12 graphically shows a thermally-assisted magnetic characteristic of the medium experimentally prepared, in which Hc is a coercive force and Ms is saturation magnetization related to a reproduction signal.

FIG. 12 graphically illustrates a thermally-assisted magnetic characteristic of the medium experimentally prepared in the present model. In FIG. 12, Hc is a coercive force and Ms is a saturation magnetization related to a read signal.

In a continuously magnetic layer such as a magneto-optical layer, since no thermal agitation will take place, Hc and Hc0 basically coincide with each other in the entire temperature range. In this second model, the composition of the recording layer was adjusted so that Ms at a temperature near the room temperature was 200 emu/cc or so for an ample magnetic signal. Also, the compensation point was set to about 100° C., recording point to two hundreds and several tens of ° C., and the Curie point was to 300° C. The medium was set along with the thermally-assisted magnetic recording head according to the present embodiment in the spin-stand type evaluation apparatus and subject to the same evaluation as for the first model.

The evaluation result was substantially the same as that of the first model. Namely, when the distance Dth from the trailing edge of the emission surface 117 to the leading edge of the recording magnetic pole 122 is within two times the beam size in the track direction on the medium plane, that is, Dth≦4L, good reproduced signals could be obtained.

Figure 13:
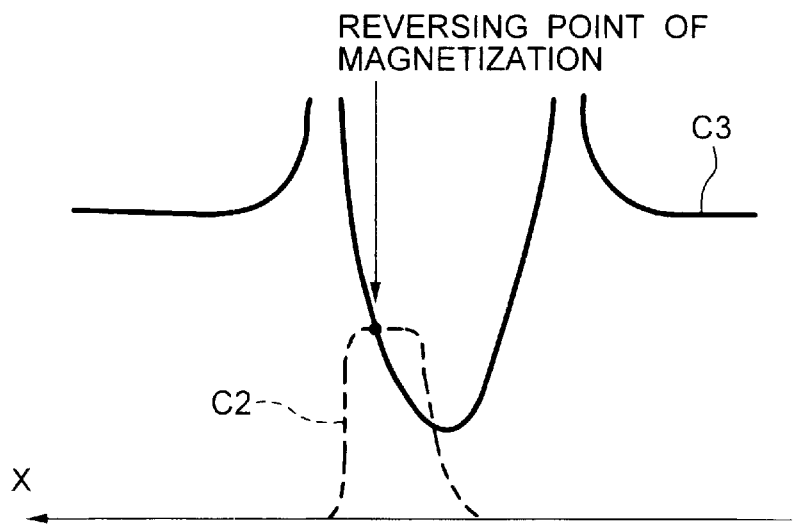
FIG. 13 is a diagram that explains the concept of a recording process in case of carrying out the invention by using the medium in FIG. 12 according to the invention.

FIG. 13 graphically explains the concept of a recording process when carrying out the invention by using the medium in FIG. 12. The construction of the thermally-assisted magnetic recording head, intensity distribution of the light beam, and temperature distribution on the medium are exactly as shown in FIGS. 116B and 11C. Different from these figures is the Hc distribution on the medium. Since the compensation point is set to nearly 100° C., Hc will be distributed as shown at C3 in FIG. 13 correspondingly to a temperature distribution B2 of FIG. 11B. The crossing point of the distribution C3 and the distribution C2 of the magnetic field supplied from the recording magnetic pole is the position where magnetization is determined in orientation.

(Third Model)

Next explained as the third model is a model using the multiparticle medium already explained with reference to the first model.

Although the first and second models directly use the light emitting portion, which is wide in the track direction, the track width of the light emitting portion had better be narrower for realizing high-density recording. From this viewpoint, by preparing a light emitting element having a reflective film on its surface nearer to the medium surface and having a fine hole in the reflective film, experimental recording was carried out.

Figure 14:
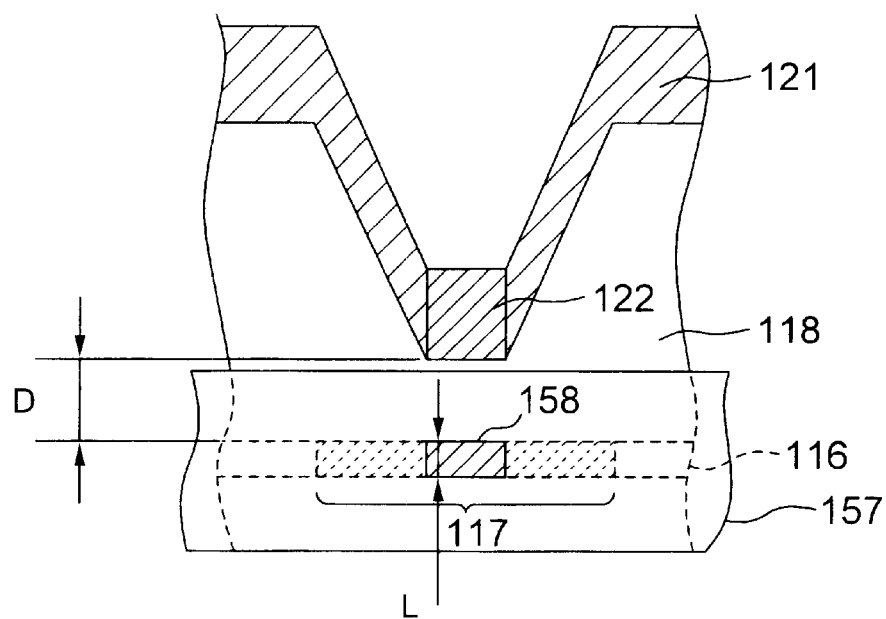
FIG. 14 is a plan that shows configuration of a major part, namely a head major part, of an example of thermally-assisted magnetic recording head having a fine hole, viewed from the medium surface.

FIG. 14 is a plan view that shows configuration of a major part of a thermally-assisted magnetic recording head having a fine hole, taken as an example. This is a view of the major part of the head from the medium surface. In FIG. 14, components having the same or equivalent functions as those shown in FIGS. 7A and 7B are labeled with common reference numerals. That is, in FIG. 14, 116 denotes an active layer, 117 a light emitting portion, 118 a trailing-side cladding layer, 121 a recording magnetic pole film, 122 a tip of a recording magnetic pole buried in the trailing-side cladding layer, 157 an Al alloy reflective film coated on the outlet surface of the light emitting element, and 158 a fine optical aperture formed in the reflective film. Difference between the structure of FIGS. 7A and 7B and the structure of FIG. 14 is the presence or absence of the reflective film 157 and the optical aperture 158, and these both structures may be common in the other respect.

The thermally-assisted magnetic recording head having the fine optical aperture as shown in FIG. 14 can be fabricated in the following manner, for example.

After making the element shown in FIGS. 7A and 7B and cleaving the substrate to expose the medium-faced surface, 5 nm thick $SiO_2$, for example, is coated as an insulating film on the medium-faced surface, and the Al alloy reflective film, 10 nm thick, is coated by sputtering. Then, Ga ions are supplied from the medium-faced surface by FIB (focused ion beam) to make the optical aperture 158.

The purpose of coating $SiO_2$ before the reflective film lies in preventing electrical contact between elements. To prevent leakage of light from the light emitting portion other than the optical aperture, the reflective film is desired to be thick. However, a thick film will undesirably increase the spacing loss of the magnetic element. Upon making the optical aperture by FIB, the tip of the recording magnetic pole may be simultaneously processed to narrow the track width of the magnetic pole. FIB process enables processing of tens of nm, which is impossible with typical PEP (photo-engraving process). In this example, the track width of the optical aperture was finished to 200 nm and the track width of the recording magnetic pole was finished 200 nm, both by FIB processing. Positioning of FIB processing may be determined similarly to the trimming process from ABS (air bearing surface) of an existing magnetic head.

In FIG. 14, distance Dth between the trailing edge of the optical aperture 158 and the leading edge of the tip 122 of the recording magnetic pole was changed in the range from 50 nm to 600 nm, and length L of the optical aperture in the track direction was processed in two ways of 50 nm and 100 nm. The head after FIB processing and further through secondary steps of cutting into chips, external leading of the electrode, slider processing, mounting of suspension, connection of the electrode, and so forth, was set on the spin-stand-type recording/reproduction evaluation apparatus used in the first example of the instant embodiment.

In this example, the track width of the GMR reproducing element was 0.6 μcm equally to the first example, and only the track width of the light spot and the track width of the recording magnetic pole were narrowed by FIB. Therefore, the reproduced output of this example decreased as compared with the first example and the second example. However, regarding whether recording was possible or impossible, reproduced output of the GMR element could revert.

Figure 15:
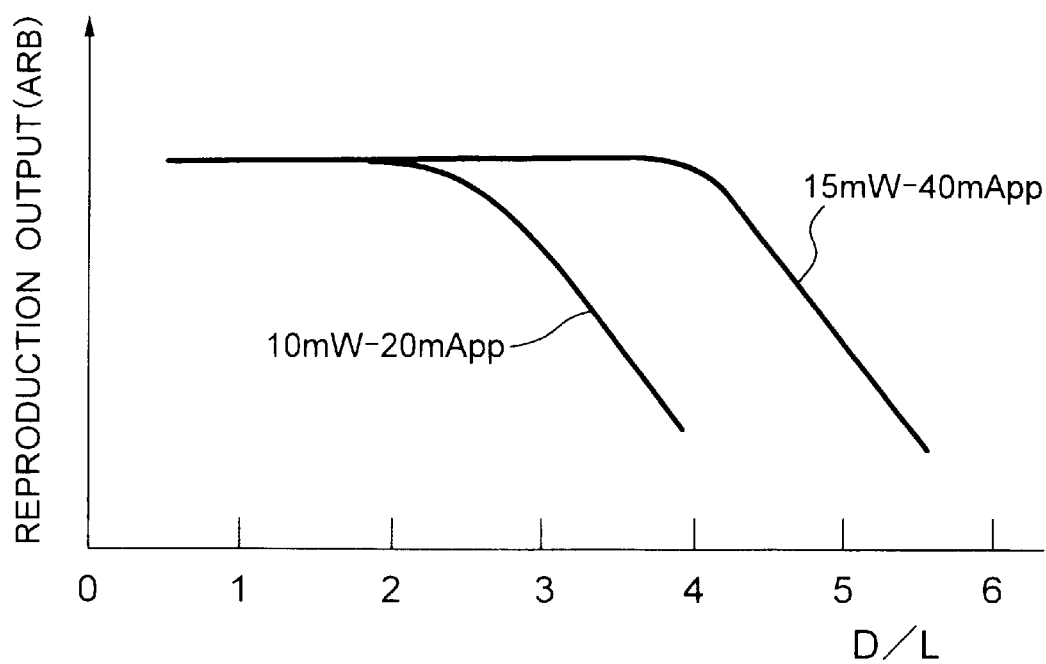
FIG. 15 graphically shows a result of experimental recording and reproduction by using the head of FIG. 14.

FIG. 15 is a graph that shows a result of experimental recording and reproduction carried out by using the head of FIG. 14. In FIG. 15, the ordinate represents the reproduced output, and the abscissa represents the Dth/L ratio. It is apparent from FIG. 15 that, also when using the fine optical aperture, the condition of Dth≦4L is preferable, and Dth≦2L is more preferable to ensure effective recording.

(Fourth Model)

Next explained is an example of thermally-assisted magnetic recorder as the fourth model of the instant embodiment.

Figure 16:
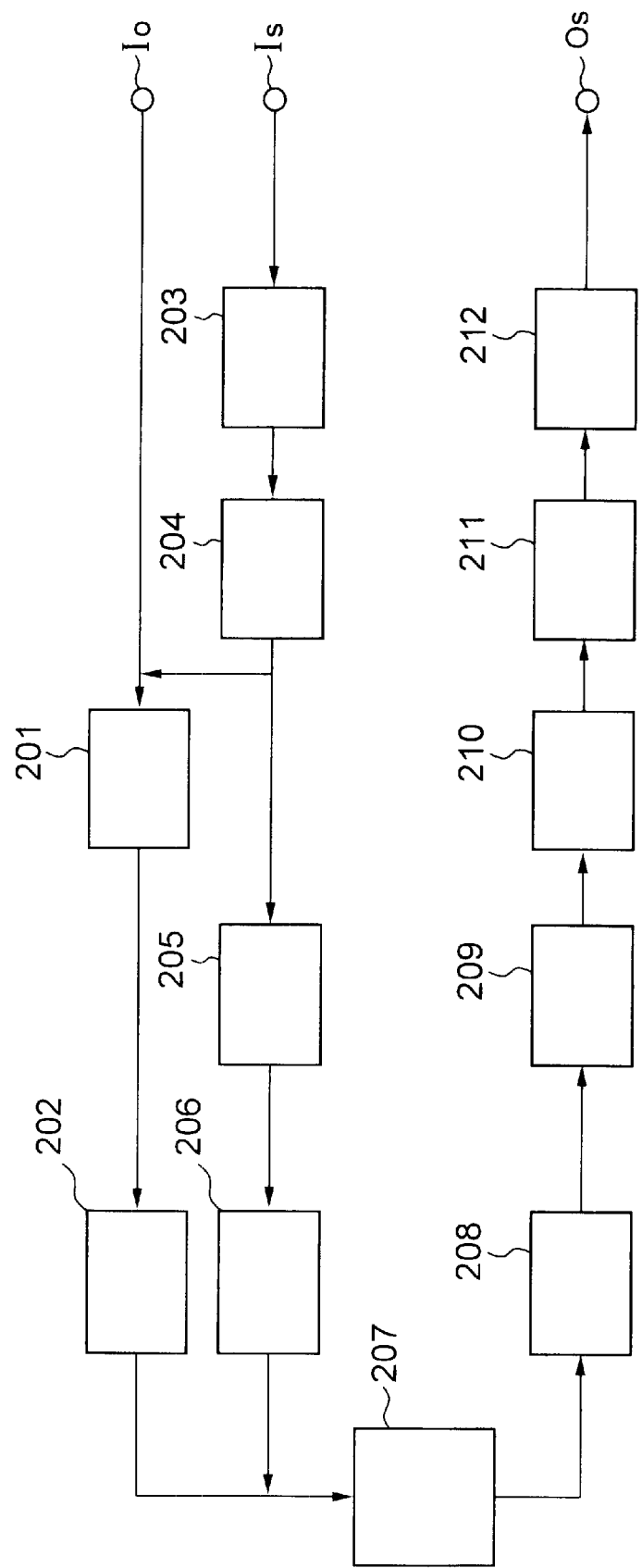
FIG. 16 is a block diagram that shows an embodied thermally-assisted magnetic recorder according to the invention.

FIG. 16 is a block diagram that shows the thermally-assisted magnetic recorder according to this model. In FIG. 16, the reference Io denotes a drive input of a light emitting element, Is a signal input, Os a signal output, 201 a drive circuit system of the light emitting element, 202 a light emitting element built in a head, 203 a ECC (error correction code) append circuit, 204 a modulation circuit, 205 a record correction circuit, 206 a recording element built in the head, 207 a medium, 208 a reproducing element built in the head, 209 an equivalent circuit, 210 a decoding circuit, 211 a demodulation circuit, and 212 an ECC circuit.

The thermally-assisted magnetic recorder according to this model is characterized by the addition of the light emitting element drive input Io, electron emitting element drive circuit 201 and light emitting element 202, the novel head construction as previously described concerning the aforementioned model, and the specially adjusted thermally-assisted magnetic characteristic of the medium as previously described concerning the aforementioned model.

To drive the light emitting element, a DC voltage may be applied to the laser element or the light emitting element may be DC-driven with no light emitting element drive circuit being provided. Also, the light emitting element may be driven in a pulsed manner synchronously with an output from the modulation circuit. The pulsed drive will make more complicate the circuit configuration, but it is preferable for a longer service life of the laser. The ECC append circuit 203 and ECC circuit 212 need not be provided. The modulation and demodulation method, and record correcting method may freely be selected.

Information is input to the medium by directing light from the light emitting element 202 to the medium and applying a recording magnetic field derived by modulating a recording signal from the recording element 206 to a position on the medium where Hc0 has been lowered due to the irradiation of light. Forming of information to be written as a magnetic transition train on the medium surface is the same as in the conventional magnetic recorder. However, when the light spot on the medium surface is curved in the direction of the track width, the magnetic transition is also curved in the direction of the track width. The curved magnetic transition is formed when the invention is carried out without providing the fine hole in the light emitting portion of the light emitting element, and also in a configuration using a fine hole when the near-field light distribution formed near the hole is curved in the track width direction. When the optical intensity distribution is linear in the track width direction as a result of specially design the configuration of the fine hole, the magnetic transition is not curved, but becomes linear. A fringing field developed from the magnetic transition train and coming from the medium is detected as a signal field by the read element 108.

The reproducing element is typically of GMR type, but it may be of the ordinary AMR (anisotropic magnetoresistance) type. In future, a TMR (tunneling magnetoresistance) type may be employed.

The thermally-assisted magnetic recording and reproduction carried out by using the above-explained structure resulted in the same evaluation as obtained from the experiment of the former model by using the spin-stand type evaluation apparatus.

(Fifth Model)

Next explained is the fifth model of the instant embodiment.

The foregoing models have been explained as providing a surface-emission type light emitting element in the leading side of an ordinary multi-layered thin-film magnetic head. This embodiment, however, is also applicable to a configuration where a surface-emission light emitting element to a planar type thin-film magnetic head.

Figure 17:
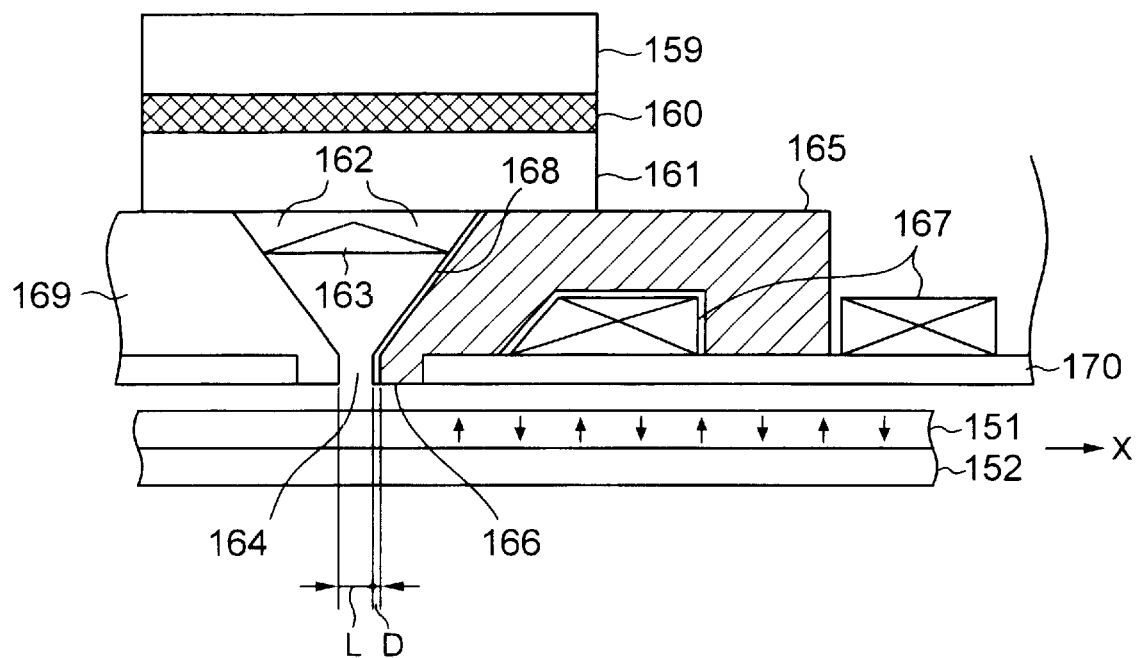
FIG. 17 shows configuration of a major part, namely only a recording element section and a surface-emitting light emitting section, of an example by application of the invention to a planar-type thin-film magnetic head.

FIG. 17 shows a configuration of a major part of an example in which the invention is applied to a planar type thin-film magnetic head, and here are shown the recording element and the surface-emission light emitting element alone. In FIG. 17, reference numeral 159 refers to an n-type cladding layer, 160 to an active layer, 161 to a p-type cladding layer, 162 to a low-refractive portion, 163 to a high refractive portion, 164 to a light emitting portion, 165 to a recording magnetic pole, 166 to the tip of a recording magnetic pole, 167 to a coil, 168 to a thermal insulator, 169 to an opposed taper portion, 170 to a protective film, 151 to a recording layer of the medium, 152 to a backing layer of the medium, X to a medium traveling direction, L to the length of the light emitting portion, Dth to the distance between the trailing edge of the light emitting portion and the leading edge of the tip of the recording magnetic pole.

Although not shown in FIG. 17, the reproducing element can be disposed in a planar structure in the leading side or trailing side of the recording element. More specifically, it is possible to use a structure in which a yoke for scooping a magnetic flux is positioned in confrontation with the medium, for example, and a GMR reproducing element is buried in the yoke.

Construction of the thermally-assisted magnetic recording head shown in FIG. 17 is explained below, following to its manufacturing process.

Used as the substrate is a sapphire substrate having a GaAs buffer layer or an ALTIC substrate having grown a relatively thick buffer layer, similarly to the foregoing model. Although FIG. 17 does not show the substrate, it is located on the upper surface of this drawing. That is, the substrate is positioned above the n-type cladding layer, and films are grown from up to down of FIG. 17.

After an n-type junction layer is grown on the substrate, not shown, an n-type AlGaAs/AlAs multi-layered cladding layer 159, InGaAs multi-layered quantum well active layer 160 and p-type GaAs/AlGaAs multi-layered cladding layer 161 are stacked sequentially. The electrode for injecting a current is provided on a side surface of the light emitting element. A Zn diffusion layer, for example, may be used as the electrode. Emission from the active layer occurs in up and down directions of the active layer, and the light is reflected and amplified by two cladding layers toward the active layer for laser oscillation.

The laser light is emitted from the lower surface of the p-type cladding layer 151 toward the recording magnetic pole. After growth of the light emitting element section, an insulating material is buried and its surface is smoothed. Thereafter, the recording element section and the converging lens section are formed. First, a tapered low-refractive section 162 is formed in the emitting section of the light emitting element, an opposite taper is formed in the center of 162, and a high-refractive section 163 is buried in the opposite-tapered portion, thereby to form the converging lens section. Light from the light emitting element section is bent inward at the boundary between the low-refractive section 162 and the high-refractive section 163, and is efficiently guided to the light emitting section 164. Suitable materials for the low-refractive section 162 are $CaF_2$, $MgF_2$, $SiO_2$, etc., and suitable materials for the high-refractive section 163 are $ZnS$, $TiO_2$, $Si_3N_4$, etc.

The converging lens section 162, 163 are used to improve the efficiency of using light, and it need not be provided when the size the light emitting section 164 is relatively large and the efficiency of use is relatively high even without the converging lens. Configuration of the converging lens observed from the medium surface may be circular, oval, square or rectangle.

After that, a low-refractive material is again formed in a tapered shape on the high-refractive section 163, and a recording magnetic pole 165 and an opposed tapered portion 169 are made by using side walls of the tapered cone. For making the recording magnetic pole 165, resist frame plating is a suitable technique. When a vertical recording system is employed, the opposed portion 169 is made of a non-magnetic material. When a lengthwise recording system is employed, it is made of the same magnetic material as that of the recording magnetic pole. Since this model employs the vertical recording system, here is used a member having a non-magnetic material such as a high-reflectance film like Cu, Al or Au, for example, on its surface.

In case that temperature is raised significantly by light, a metal having a high melting point. such as W, Mo or Ta is preferably provided. It is also recommended to cover the tapered surface of the recording magnetic pole with a high-reflectance film or a high-melting-point metal film as a thermal insulator 168. In this way, it is possible to prevent an increase of the temperature of the recording magnetic pole by light and thereby prevent a decrease of the recording magnetic field, and simultaneously improve the efficiency of using light. The thermal insulator may be a metal coating alone, but the effect of preventing a temperature increase of the recording magnetic pole can be enhanced by stacking a ceramics member with a low thermal conductivity and a metal film.

After the recording magnetic pole 165 and the opposed portion 169 are formed, a coil hole is formed inside the magnetic pole. Subsequently, a Cu coil portion 167 for supplying a recording current is made by frame plating, for example. After that, the recording magnetic pole tip 166 is made by fine processing such as PEP or FIB. Depending on the size, also the light emitting section 164 is preferably finished by FIB.

By finally coating the protective film 170, the thermally-assisted magnetic head shown in FIG. 17 is completed.

Using the thermally-assisted magnetic recording head prepared in this manner, the same evaluation as the former model was carried out. As a result, when Dth<4L, effective recording was possible. Also in the construction of FIG. 17, the recording magnetic pole is configured to bury its tip in the light emitting element.

As explained above with reference to the first to fifth models, the instant embodiment can provide a sufficiently high thermal agitation resistance near the room temperature to a low-noise multiparticle medium having an extremely small grain size required for high-density recording and reproduction, and can simultaneously reduce the required intensity of magnetic field for flux reversal of the medium by irradiation of light in the recording magnetic field applying section, thereby to realize high-sped recording with a practical recording head. Additionally, by employing the integral structure of the light emitting element and the recording/reproducing elements, the embodiment can provide a compact, light thermally-assisted magnetic recording head and thereby enables high-speed seek operation and provides the head and the drive economically.

Heretofore, the first to third embodiments of the invention have explained, referring to some models. The invention, however, is not limited to these models.

For example, regarding structures and materials of electron emitters or light emitting elements as heat sources, magnetic recording heads, magnetic reproducing heads, and so on, any appropriate ones selected by those skilled in the art from those of known techniques can be used alternatively to obtain the same effects.

Also regarding recording mediums, any of various magnetically recording mediums may be used, either of the "horizontal recording" type or of the "vertical recording" type, such as "keepered media" having both a magnetic recording layer and a soft-magnetic layer.

Furthermore, the recording medium is not limited to a so-called hard disk, but may be any of all types of mediums capable of magnetically recording information, such as flexible disk, magnetic card, and so on.

Also regarding the magnetic recorder, it may be of the type only for magnetic recording, or of the type for both recording and reproduction. As to positional relation between the magnetic head and the medium, any of the "floating traveling type" or "contact traveling type" may be employed. Also usable is a magnetic recorder of a "removable" type, which removably receives a recording medium therein.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

The entire disclosure of Japanese Patent Application No. H11-375083 filed on Dec. 28, 1999 including specification, claims, drawings and summary is incorporated herein by reference in its entirety.

What is claimed is:

1. A thermally-assisted magnetic recording method comprising;

a step of heating a recording medium having a recording portion to decrease a coercive force of the recording portion; and a step of applying a magnetic field from a magnetic pole onto the recording portion decreased in coercive force to record information magnetically, wherein a reversing point of magnetization where the coercive force of the recording portion equals an intensity of the magnetic field is located in a position in a leading side of a trailing edge of the magnetic pole.

2. The thermally-assisted magnetic recording method according to claim 1, wherein the reversing point of magnetization is located between the leading edge and the trailing edge of the magnetic pole.

3. The thermally-assisted magnetic recording method according to claim 1, wherein a relation of $D \leq Bmin$ is satisfied, where D is a distance from the reversing point of magnetization and the trailing edge of the magnetic pole, and Bmin is a minimum magnetic transition distance being recorded on the recording portion.

4. The thermally-assisted magnetic recording method according to claim 1, wherein a relation of $Dmr \leq v \cdot \Delta T \leq Dmr + Lmag$ is satisfied, where Lmag is a distance from the leading edge to the trailing edge of the magnetic pole, Dmr is a distance from the trailing edge of the magnetic pole to a center of a magnetic reproducing element which is provided on a trailing side of the magnetic pole to reproduce the information recorded on the magnetic portion, $\Delta T$ is a time interval from a moment of reverting the magnetic field for magnetic transition on the recording portion to a moment for the magnetic reproducing element to reproduce the magnetic transition recorded on the recording portion, and v is a relative velocity between the recording portion and the magnetic pole.

5. The thermally-assisted magnetic recording method according to claim 1, wherein the recording portion is heated by emitting electrons toward the recording medium.

6. The thermally-assisted magnetic recording method according to claim 5, wherein the electrons are emitted from an emitter of a field emission-type.

7. The thermally-assisted magnetic recording method according to claim 1, wherein the recording portion is heated by emitting a light toward the recording medium from a light emitting element provided on the leading side of the magnetic pole, and a relation of $Dth \leq 4L$ is satisfied, where Dth is a distance from a trailing edge of an emitting portion of the light emitting element to the leading edge of the magnetic pole, and L is a distance from a leading edge to the trailing edge of the emitting portion.

8. A thermally-assisted magnetic recording method comprising;
   a step of irradiating a light from a light emitting element to heat a recording medium having a recording portion to decrease a coercive force of the recording portion; and
   a step of applying a magnetic field from a magnetic pole onto the recording portion decreased in coercive force to record information magnetically,
   wherein before the recording portion heated by the light emitting element passes through the magnetic field applied by the magnetic pole, the coercive force of the recording portion becomes smaller than the magnetic field, and a relation of $Dth \leq 4L$ is satisfied, where Dth is a distance from a trailing edge of an emitting portion of the light emitting element to a leading edge of the magnetic pole, and L is a distance from the leading edge to the trailing edge of the emitting portion.

9. The thermally-assisted magnetic recording method according to claim 8, wherein the light emitting element is a laser element having a fine hole, and the emitting portion is the fine hole.

10. A thermally-assisted magnetic recorder comprising:
    a heat source configured to heat a recording portion of a recording medium; and
    a magnetic pole configured to record information magnetically by applying a magnetic field to the recording portion heated by the heat source and decreased in coercive force,
    wherein a reversing point of magnetization where the coercive force of the recording portion equals an intensity of the magnetic field is located in a position in a leading side of a trailing edge of the magnetic pole.

11. The thermally-assisted magnetic recorder according to claim 10, wherein a relation of $D \leq Bmin$ is satisfied, where D is a distance from the reversing point of magnetization to the trailing edge of the magnetic pole, and Bmin is a minimum magnetic transition distance recorded on the recording portion.

12. The thermally-assisted magnetic recorder according to claim 10, further comprising a magnetic reproducing element, located in a position in the trailing side of the recording magnetic pole, configured to reproduce the information recorded on the recording portion.

13. The thermally-assisted magnetic recorder according to claim 12, wherein a relation of $Dmr \leq v \cdot \Delta T \leq Dmr + Lmag$ is satisfied, where Lmag is a distance from the leading edge to the trailing edge of the magnetic pole, Dmr is a distance from the trailing edge of the magnetic pole to a center of the magnetic reproducing element, $\Delta T$ is a time interval from a moment of reverting the magnetic field for recording magnetic transition on the recording portion to a moment for the magnetic reproducing element to reproduce the magnetic transition recorded on the recording portion, and v is a relative velocity between the recording portion and the magnetic pole.

14. The thermally-assisted magnetic recorder according to claim 10, wherein the heat source is an electron emitter which emits electrons toward the recording medium to heat the recording portion.

15. The thermally-assisted magnetic recorder according to claim 14, wherein the electron emitter is of a field emission-type.

16. The thermally-assisted magnetic recorder according to claim 10, wherein the heat source is a light emitting element located in a position in the leading side of the magnetic pole, and a relation of $Dth < 4L$ is satisfied, where Dth is a distance from a trailing edge of an emitting portion of the light emitting element to the leading edge of the magnetic pole, and L is a distance from a leading edge to the trailing edge of the emitting portion.

17. A thermally-assisted magnetic recorder comprising:
    a light emitting element as a heat source configured to heat a recording portion of a recording medium; and
    a magnetic pole, located in a position in the trailing side of the light emitting element, configured to record magnetic information on the recording portion of the recording medium heated by the light emitting element by applying a magnetic field,
    wherein before said recording portion heated by the heat source passes through the magnetic field applied by the magnetic pole, a coercive force of the recording portion becomes smaller than the magnetic field, and a relation of $Dth \leq 4L$ is satisfied, where Dth is a distance from a trailing edge of an emitting portion of the light emitting element to a leading edge of the magnetic pole, and L is a distance from the leading edge to the trailing edge of the emitting portion.

18. The thermally-assisted magnetic recorder according to claim 17, wherein the magnetic pole is monolithically buried in a position in the trailing side of the light emitting element.

19. The thermally-assisted magnetic recorder according to claim 17, wherein the light emitting element is a laser element having a fine hole, and the emitting portion is said fine hole.

20. The thermally-assisted magnetic recorder according to claim 19, wherein an evanescent wave is provided from the fine hole.

* * * * *